US011606697B2

(12) United States Patent
duPont et al.

(10) Patent No.: US 11,606,697 B2
(45) Date of Patent: Mar. 14, 2023

(54) ELECTRONIC SYSTEM FOR CONSTRUCTION AND DETECTION OF SPATIAL MOVEMENTS IN A VR SPACE FOR PERFORMANCE OF ELECTRONIC ACTIVITIES

(71) Applicant: BANK OF AMERICA CORPORATION, Charlotte, NC (US)

(72) Inventors: Justin Riley duPont, Charlotte, NC (US); Heather Roseann Dolan, Sarasota, FL (US); Michael Donohue, Medfield, MA (US); Tony England, Tega Cay, SC (US); Lindsay Higgins, Charlotte, NC (US); Malathi Jivan, San Jose, CA (US); Christina Ann Lillie, Ann Arbor, MI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 302 days.

(21) Appl. No.: 16/983,806

(22) Filed: Aug. 3, 2020

(65) Prior Publication Data
US 2022/0038891 A1 Feb. 3, 2022

(51) Int. Cl.
*H04W 12/68* (2021.01)
*G06T 19/00* (2011.01)
(Continued)

(52) U.S. Cl.
CPC .......... *H04W 12/68* (2021.01); *G06T 19/006* (2013.01); *G06V 40/20* (2022.01); *H04W 12/068* (2021.01)

(58) Field of Classification Search
CPC .... H04W 12/68; H04W 12/068; G06V 40/20; G06T 19/006
See application file for complete search history.

(56) References Cited

U.S. PATENT DOCUMENTS 5,877,803 A 3/1999 Wee et al.
7,529,690 B2 5/2009 Hadi
(Continued)

OTHER PUBLICATIONS

Nawijn, B., "9 Applications of AR & VR in the Financial Industry," TJIP, Mar. 23, 2018, https://www.tjip.com/en/publications/9-applications-of-ar-vr-in-the-financial-industry.
(Continued)

*Primary Examiner* — Doon Y Chow
(74) *Attorney, Agent, or Firm* — Moore & Van Allen PLLC; Vaidehi Bachoti

(57) ABSTRACT

In general, apparatuses, methods and computer program products for construction and detection of spatial movements in a virtual reality (VR) space for performance of electronic activities are disclosed. A VR composite credential authentication device is provided that is configured is structured for capturing, customizing and transforming one or more VR composite credentials of a user and authenticating electronic activities based on at least the VR composite credentials. The VR composite credentials of the user are captured using one or more VR spatial sensor devices which are configured for capture and imaging of VR spatial movement and position credentials. The captured credentials are analyzed to determine an associated electronic activity. The electronic activity is initiated, automatically, in response to the successful validation of the captured credentials. Moreover, the invention allows for setting-up an infinitely customizable library of registered VR composite credentials.

19 Claims, 8 Drawing Sheets

(51) Int. Cl.
*H04W 12/06* (2021.01)
*G06V 40/20* (2022.01)

(56) References Cited

U.S. PATENT DOCUMENTS

| | | | |
|---|---|---|---|
| 7,701,439 | B2 | 4/2010 | Hillis et al. |
| 8,487,938 | B2 | 7/2013 | Latta et al. |
| 8,693,724 | B2 | 4/2014 | Ahmed et al. |
| 9,019,201 | B2 | 4/2015 | Holmdahl et al. |
| 9,576,285 | B2 | 2/2017 | Zhou |
| 9,696,808 | B2 | 7/2017 | Nishihara et al. |
| 9,971,491 | B2 | 5/2018 | Schwesinger et al. |
| 10,133,857 | B2 | 11/2018 | Arunachalam |
| 10,228,762 | B2 * | 3/2019 | Smith ............... G06F 3/04815 |
| 10,311,223 | B2 | 6/2019 | Adams et al. |
| 10,331,222 | B2 | 6/2019 | Kim et al. |
| 10,353,474 | B2 | 7/2019 | Sharma et al. |
| 2011/0134108 | A1 | 6/2011 | Hertenstein |
| 2011/0184865 | A1 * | 7/2011 | Mon ..................... G07F 19/201 235/379 |
| 2011/0213709 | A1 * | 9/2011 | Newman .......... G06Q 20/40145 705/44 |
| 2012/0232966 | A1 | 9/2012 | Caiman et al. |
| 2014/0181678 | A1 | 6/2014 | Louchheim et al. |
| 2014/0380182 | A1 | 12/2014 | Lu et al. |
| 2015/0046284 | A1 | 2/2015 | Hart |
| 2015/0073907 | A1 | 3/2015 | Purves et al. |
| 2016/0188849 | A1 * | 6/2016 | Eramian ............... H04L 63/107 726/5 |
| 2016/0217623 | A1 | 7/2016 | Singh |
| 2018/0323972 | A1 | 11/2018 | Reed et al. |

OTHER PUBLICATIONS

Pilcher, J., "10 Ways Banks and Credit Unions are using Virtual Reality," The Financial Brand, Nov. 13, 2017, https://thefinancialbrand.com/68593/banks-credit-unions-finances-virtual-reality/.

* cited by examiner

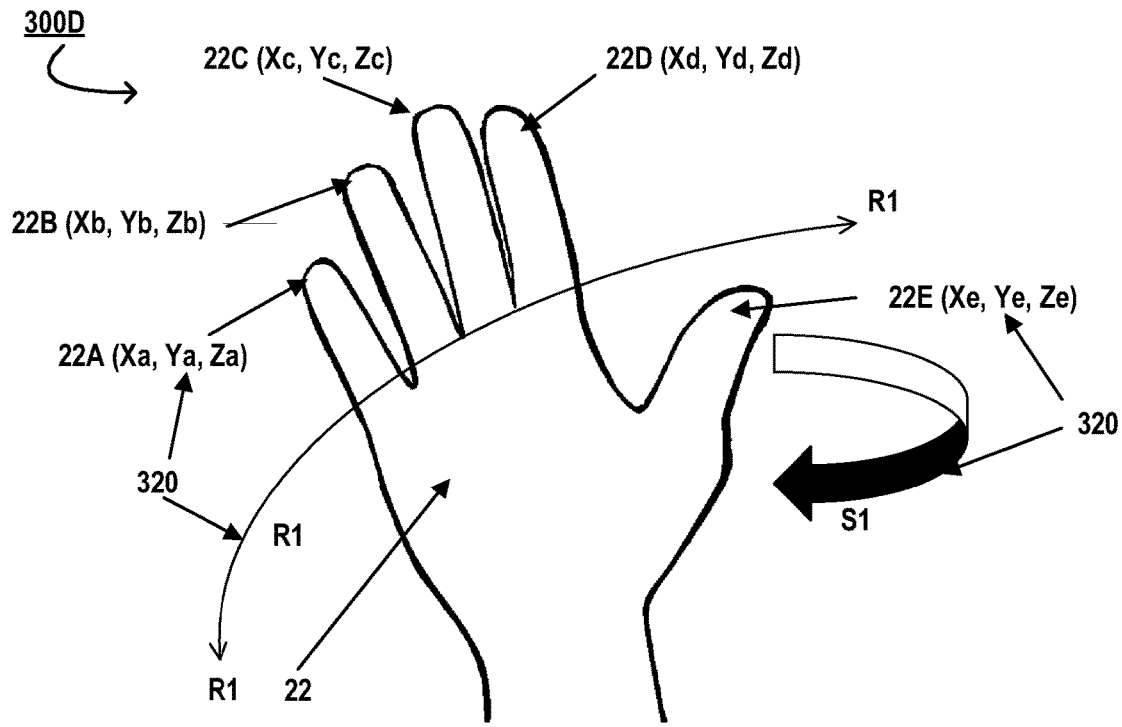
FIGURE 3D
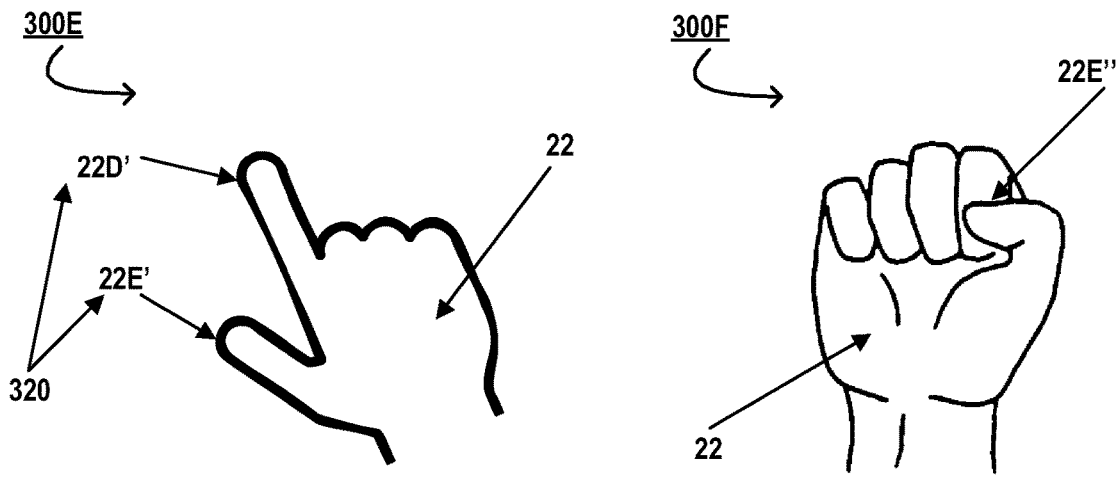
FIGURE 3E
FIGURE 3F

ELECTRONIC SYSTEM FOR CONSTRUCTION AND DETECTION OF SPATIAL MOVEMENTS IN A VR SPACE FOR PERFORMANCE OF ELECTRONIC ACTIVITIES

FIELD OF THE INVENTION

Embodiments of the invention are directed to a novel electronic system for construction and detection of spatial movements in a virtual reality (VR) space for performance of electronic activities. In some embodiments, the invention includes a VR composite credential authentication device structured for capturing, customizing and transforming one or more VR composite credentials of a user and authenticating electronic activities based on at least the VR composite credentials.

BACKGROUND

Typically, users are required to provide authentication credentials for performing one or more user activities. In this regard, the user may be required to slide cards with magnetic strips, provide one or more textual identifiers, and often be required to provide the accompanying validation information associated with the individual resource processing device and/or the individual card provided for authentication. Furthermore, the cards associated with the user and authentication data associated with the user such as usernames and passcodes may not be secure. Conventional systems may not be able to determine whether the authentication data is securely in possession of the user, and may allow activities to be performed even if the authentication data is provided by unauthorized individuals. In addition to being potentially unsecure and time consuming due to undesirable wait times, the present system requires the users carry the cards, and memorize the validation information for authenticating user activities. Carrying multiple cards/devices may be cumbersome for the user, and may be fraught with security concerns since the cards often comprise the user's personal and financial information. Furthermore, in some instances, the user may be reluctant to provide personal financial information in public terminals, terminals whose provenance is unknown to the user, or devices without secure connections, and therefore be unable to perform the desired user activity. Thus, a need presently exists for a secure and accurate technical device and system of authorizing and/or authenticating the user electronically, based on credentials that are readily available to the user, which addresses the above listed shortcomings of conventional systems.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods construction and detection of spatial movements in a virtual reality (VR) space for performance of electronic activities. Particularly, embodiments of the present invention are directed to, via a VR composite credential authentication device, is structured for capturing, customizing and transforming one or more VR composite credentials of a user and authenticating electronic activities based on at least the VR composite credentials. In some instances, the invention comprises a first VR composite credential authentication device comprising one or more composite credential sensor devices. The one or more composite credential sensor devices may comprise one or more VR spatial sensor devices configured for capture and imaging of VR spatial movement and position credentials and one or more biometric sensor devices. The invention may further comprise a computer apparatus including at least one memory device with computer-readable program code stored thereon, at least one communication device, and at least one processing device operatively coupled to the first VR composite credential authentication device, the at least one memory device and the at least one communication device, wherein executing the computer-readable code is configured to cause the at least one processing device to: identify initiation of an activity by a user at a resource processing device; establish, an operative communication channel with the first VR composite credential authentication device, the first VR composite credential authentication device being associated with the one or more composite credential sensor devices; capture, using the one or more composite credential sensor devices of the first VR composite credential authentication device, one or more VR composite credentials of a user at a first time, wherein capturing the one or more VR composite credentials of the user further comprises identifying the user based on the captured one or more VR composite credentials; transform the captured one or more VR composite credentials into a first coded word set; determine a first electronic activity associated with the first coded word set of the captured one or more VR composite credentials, wherein determining the first electronic activity further comprises: parsing a VR credential database associated with the user; identifying a first VR authentication linked pair associated with the first coded word set stored in the VR credential database; and determining the first electronic activity based on the first VR authentication linked pair; determine one or more credential parameters associated with the captured one or more VR composite credentials; authenticate the user for the first electronic activity based on validating the one or more credential parameters associated with the captured one or more VR composite credentials for the first electronic activity; and transmit control instructions to the resource processing device that cause the resource processing device to process the first electronic activity in response to the successful authentication of the user for the first electronic activity.

In one embodiment, or in combination with the previous embodiment, the one or more VR composite credentials are associated with phalanges of the user, wherein the one or more credential parameters associated with the one or more one or more VR composite credentials comprise hand position of one or more hands of the user, finger position of one or more fingers of the user, hand movement of one or more hands of the user and/or finger movement of one or more fingers of the user.

In one embodiment, or in combination with any of the previous embodiments, capturing the one or more VR composite credentials of the user further comprises: detecting, using the one or more VR spatial sensor devices, one or more first mechanical degree of freedom coordinate parameters of the user in a predetermined capture region proximate the one or more VR spatial sensor devices; analyzing the detected first mechanical degree of freedom coordinate parameters to determine that the detected first mechanical degree of freedom coordinate parameters are associated with at least one credential parameter range associated with the user stored at the VR credential database; and determining one or more spatial position-movement credentials of the user based on the detected one or more first mechanical degree of freedom coordinate parameters, wherein the one or more VR composite credentials of the user comprise the one or more spatial position-movement credentials.

In one embodiment, or in combination with any of the previous embodiments, the invention is further configured to: detect, using the one or more VR spatial sensor devices, one or more second mechanical degree of freedom coordinate parameters of the user in the predetermined capture region proximate the one or more VR spatial sensor devices; discard the one or more second mechanical degree of freedom coordinate parameters in response to determining that the detected first mechanical degree of freedom coordinate parameters are not associated with at least one credential parameter range associated with the user stored at the VR credential database.

In one embodiment, or in combination with any of the previous embodiments, capturing the one or more VR composite credentials of the user further comprises: detecting, using the one or more VR spatial sensor devices, a first VR composite credential of the one or more VR composite credentials, wherein the first VR composite credential comprises one or more spatial position-movement credentials of the user; and detecting, using the one or more biometric sensor devices, a second VR composite credential of the one or more VR composite credentials, wherein the second VR composite credential comprises one or more biometric credentials of the user, wherein the one or more biometric credentials comprise (i) a facial image credential, (ii) a user voice credential, and/or (iii) a user verbal phrase credential; and wherein the one or more VR composite credentials comprise (i) the one or more spatial position-movement credentials of the user and (ii) the biometric credentials of the user; and wherein validating the one or more credential parameters associated with the captured one or more VR composite credentials for the first electronic activity comprises validating the one or more credential parameters associated with (i) the one or more spatial position-movement credentials of the user and (ii) the biometric credentials of the user.

In one embodiment, or in combination with any of the previous embodiments, establishing the operative communication channel with the first VR composite credential authentication device further comprises: identifying a plurality of VR composite credential authentication devices associated with the resource processing device; determining that the first VR composite credential authentication device is compatible for capturing the one or more VR composite credentials from the user at the first time based on (i) a position of the user, (ii) a credential type associated with the one or more VR composite credentials; and activating the first VR composite credential authentication device of the plurality of VR composite credential authentication devices in response to determining that the first VR composite credential authentication device is compatible for capturing the one or more VR composite credentials from the user at the first time.

In one embodiment, or in combination with any of the previous embodiments, the invention is further configured to: deactivate a second VR composite credential authentication device of the plurality of VR composite credential authentication devices in response to determining that the second VR composite credential authentication device is not compatible for capturing the one or more VR composite credentials from the user at the first time.

In one embodiment, or in combination with any of the previous embodiments, establishing the operative communication channel with the first VR composite credential authentication device further comprises: detecting a malfunction associated with a first authentication method associated with the resource processing device; and in response to detecting the malfunction, activating the one or more composite credential sensor devices of the first VR composite credential authentication device.

In one embodiment, or in combination with any of the previous embodiments, the invention is further configured to customizably register the user for VR composite credential authentication at a second time preceding the first time, wherein registering further comprises: requesting one or more authentication credentials from the user; authenticating the user for registration based at least on the successful validation of the one or more authentication credentials received from the user; determining one or more electronic activities associated with the user, wherein determining the one or more electronic activities comprises determining a required authentication level associated with each of the one or more electronic activities; receiving a user activity input associated with selection of the first electronic activity of the one or more electronic activities; determining at least one credential type associated with the required authentication level of the selected first electronic activity and display the credential type to the user; receiving at least one first VR composite credential from the user, wherein the first VR composite credential is configured for authenticating the user for the first electronic activity; determining whether the at least one first VR composite credential associated with the selected first electronic activity matches the at least the required authentication level for the first electronic activity; in response to determining that the at least one first VR composite credential associated with the selected first electronic activity matches the at least the required authentication level for the first electronic activity, constructing the first VR authentication linked pair associated with the at least one first VR composite credential, wherein the first VR authentication linked pair comprises an coded activity word component associated with the first electronic activity and the first coded word set associated with the at least one first VR composite credential; and storing the constructed first VR authentication linked pair in the VR credential database.

In one embodiment, or in combination with any of the previous embodiments, the invention is further configured to, in response to determining that the at least one first VR composite credential associated with the selected first electronic activity matches the at least the required authentication level for the first electronic activity: request the user to present the at least one first VR composite credential for a predetermined additional number of times; capturing the at least one first VR composite credential from the user sequentially, for each the predetermined additional number of times; determining one or more median credential parameters associated with the captured at least one first VR composite credential for each the predetermined additional number of times; determining a credential parameter range for each of the one or more median credential parameters based on the one or more median credential parameters associated each the predetermined additional number of times; and storing the storing the credential parameter range for each of the one or more median credential parameters in the VR credential database linked to the first VR authentication linked pair; and wherein validating the one or more credential parameters associated with the captured one or more VR composite credentials for the first electronic activity at the first time comprises determining that each of the one or more credential parameters match the associated credential parameter range.

In one embodiment, or in combination with any of the previous embodiments, transforming the captured one or more VR composite credentials into the first coded word set further comprises: performing pre-processing of the captured one or more VR composite credentials; extracting the one or more credential parameters of the captured one or more VR composite credentials; parsing a plurality of coded work sets associated with the user from the VR credential database associated with the user; and identifying the first coded word set of the plurality of coded work sets that matches the one or more credential parameters.

In one embodiment, or in combination with any of the previous embodiments, the one or more VR composite credentials comprise one or more spatial position-movement credentials of the user, wherein determining one or more credential parameters associated with the captured one or more VR composite credentials further comprises determining a first gesture associated with the one or more spatial position-movement credentials.

In one embodiment, or in combination with any of the previous embodiments, determining one or more credential parameters associated with the captured one or more VR composite credentials further comprises: determining one or more dimensional parameters associated with the one or more spatial position-movement credentials, wherein the one or more dimensional parameters comprise a size parameter and/or a distance parameter; and wherein validating the one or more credential parameters for the first electronic activity further comprises determining that (i) the first gesture and (ii) the one or more dimensional parameters associated with the one or more spatial position-movement credentials match the first electronic activity.

In one embodiment, or in combination with any of the previous embodiments, determining one or more credential parameters associated with the captured one or more VR composite credentials further comprises: determining a symbol parameter associated with the one or more spatial position-movement credentials, wherein the symbol parameter comprises a symbol traced by the one or more spatial position-movement credentials; and wherein validating the one or more credential parameters for the first electronic activity further comprises determining that (i) the first gesture and (ii) the symbol parameter associated with the one or more spatial position-movement credentials match the first electronic activity.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3D illustrates a schematic representation 300D of VR composite credentials associated with phalanges of a user in a first position, in accordance with an embodiment of the invention;

FIG. 3E illustrates a schematic representation 300E of VR composite credentials associated with phalanges of a user of FIG. 3D in a second position, in accordance with an embodiment of the invention;

FIG. 3F illustrates a schematic representation 300F of VR composite credentials associated with phalanges of a user of FIG. 3F in a third position, in accordance with an embodiment of the invention;

DETAILED DESCRIPTION OF EMBODIMENTS OF THE INVENTION

Figure 1:
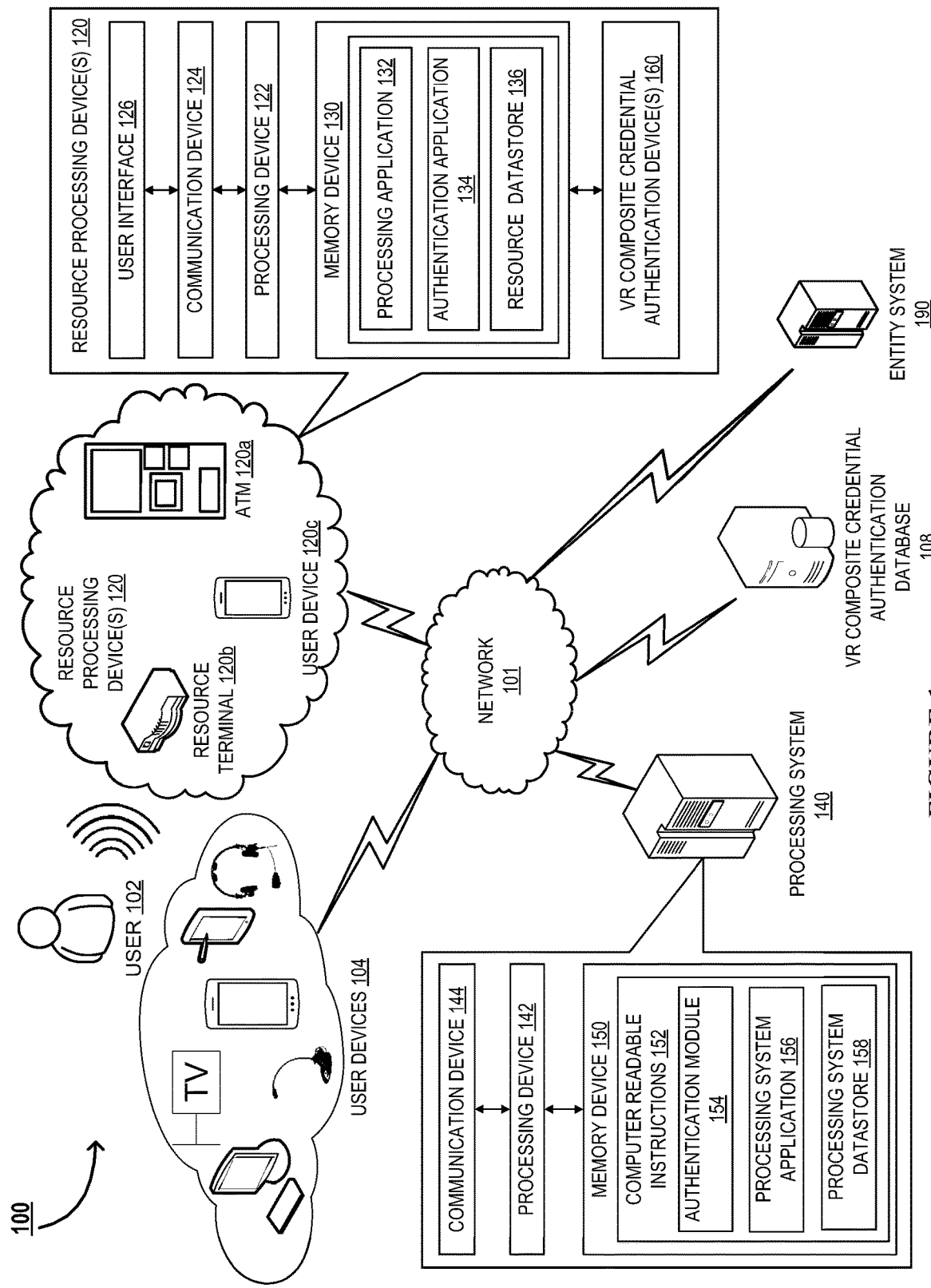
FIG. 1 illustrates a block network architecture diagram illustrating an authentication technology environment 100, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with the embodiments of the invention, the term "VR composite credentials" may refer to spatial movement and position credentials of the user's body that may be used to identify users and/or verify the identity of the user. In some embodiments, the spatial movement and position credentials may refer to the position, location, movement, gestures and/or the like of the user's phalanges, i.e., the user's hand(s) and/or finger(s). In some embodiments, the spatial movement and position credentials may refer to the position, location, movement, gestures and/or the like of other body parts of the user such as the user's feet, arms, head, legs, etc. In some embodiments, the VR composite credentials may refer to a combination of spatial movement and position credentials of the user's body and one or more biometric credentials of the user such (i) a facial image credential, (ii) a user voice credential, and/or (iii) a user verbal phrase credential. In some embodiments the one or more biometric credentials may further comprise iris recognition, retina scans, fingerprints, finger veins, palm veins, palm prints, digital bone anatomy/structure and positioning (distal phalanges, intermediate phalanges, proximal phalanges, and the like). In some embodiments, the VR composite credentials are non-tactile, i.e., not based on touch or contact between the user and components/devices, for authenticating the user.

In accordance with embodiments of the invention, the term "user" may refer to a customer or the like, who utilizes an external apparatus, terminal or device capable of facilitating transactions or activities. In accordance with embodiments of the invention, the term "entity" may refer to a customer, seller, merchant, or the like. In some embodiments, the term "entity" may refer to a financial institution or a financial entity.

The term "resource processing device" or "transaction terminal" as used herein may refer to one or more electronic devices that facilitate user transactions or activities. As such, the terms "electronic activity", "user transaction" or "user activity" may refer to financial or non-financial transactions or activities. In some embodiments a resource processing device refers to one or more devices that facilitate execution of financial transactions. In this regard the resource processing devices can comprise Automated Teller Machines (ATMs), resource terminals or Point of sale devices (POS), vending machines, checkout registers, ticket vending machines, automated retail transaction devices, banking terminals in a financial institution and other transaction terminals that involve financial transactions in one form or another. In some embodiments the resource processing device refers to devices that facilitate execution of non-financial transactions or activities, for example, check-in terminals for various industries, for example: hospitality, travel, and the like, information kiosks and other transaction terminals that do not involve a user performing a financial transaction via the transaction terminal. In some embodiments the resource processing devices facilitate execution of both financial and non-financial transactions/activities. In some embodiments, resource processing devices may refer to user devices that facilitate financial and/or non-financial transactions, such as laptop computers, tablet computers, smartphones, wearable devices, personal digital assistants (PDAs), and other portable or stationary computing devices. In some embodiments, the resource processing devices may be owned, operated and/or otherwise associated entities and are installed at suitable locations, such that the user can travel to the location of the resource processing device to execute transactions. In some embodiments, the resource processing devices may be owned, operated and/or otherwise associated with an entity, such as a financial institution. In some embodiments, the resource processing devices may be owned, operated and/or otherwise associated with the user. The embodiments described herein may refer to the initiation and completion of an electronic activity, a user activity or a transaction.

Typically, users are required to provide authentication credentials for performing one or more user activities. Typically resource processing devices require the user to perform one or more authentication steps based on the level of authorization desired for a particular activity/transaction. In this regard, the user may be required to slide cards with magnetic strips, provide one or more textual identifiers (e.g., one or more account numbers, userID and the like), and often be required to provide the accompanying validation information (e.g., personal identification numbers (PIN), passwords, CVV numbers and the like) associated with the individual resource processing device and/or the individual account/card provided for authentication. Furthermore, the cards associated with the user and authentication data associated with the user such as usernames and passcodes may not be secure. Conventional systems may not be able to determine whether the authentication data is securely in possession of the user, and may allow activities to be performed even if the authentication data is provided by unauthorized individuals. In addition to being potentially unsecure and time consuming due to undesirable wait times, the present system requires the users carry credit cards, debit cards, or other physical cards with magnetic strips or chips, and provide the corresponding PINs and passcodes to enable the user to perform transactions. Carrying multiple cards/devices may be cumbersome for the user, and carting these cards around on a daily basis may be fraught with security concerns since the cards often comprise the user's personal and financial information. Furthermore, in some instances, the user may be reluctant to provide personal financial information in public resource processing devices, resource processing devices whose provenance is unknown to the user, or devices without secure connections, and therefore be unable to perform the desired user activity. In some instances, the various cards associated with the user are not interchangeable and the user is required to carry specific cards associated with specific resource processing devices to perform transactions. Typically, the user is required to carry separate cards or keys for the same activity. For example, for the same activity of withdrawing funds from two separate accounts of the user, the user is required to present two separate cards, each associated with the account and the entity associated with the account. In other instances, although resource processing devices may accept cards other than the specific cards associated with the resource processing device, performing transactions with such cards may require added processing and additional wait times. However, this protracted process only marginally increases the security and confidence of the transaction, since the cards and the associated PINs may be available to unauthorized persons unbeknownst to the user, who may perform transactions with the user's credentials. Moreover, in conventional systems the user is required to contact/touch multiple surfaces for performing activities and for providing authentication credentials, thereby causing undesirable spread of germs. Also, conventional facial recognition systems do not function when the user is adorning face masks for preventing spread of germs.

The present invention provides an innovative, secure and accurate technical system and method of authorizing and/or authenticating the user electronically, based on VR composite credentials of a user unique to the user, which addresses the above listed shortcomings of conventional systems/devices. Typically, these VR composite credentials of a user relate to spatial movement and position of the user's body, are always available to the user, without requiring separate transportation, do not need separate devices for initiating activities/transactions, can be widely used, and are not easily replicated or obtained in a unauthorized manner. Furthermore, the novel VR composite credential authentication described herein, is infinitely customizable such that the user can register and use the specific type and combination of VR composite credentials that the user is comfortable with and that the user may remember well. Although the conventional systems may enable the user to choose a PIN or a passcode, the user is still required to meet cumbersome string length and character criteria. Moreover, the user is not able to customize the cards and other physical payment vehicles to suit the user's needs in conventional systems. Because the VR composite credentials are non-tactile, i.e., not based on touch or contact between the user and components/devices, the user may be authenticated without contacting contaminated surfaces of devices which may result in undesirable spread of germs. Moreover, the VR composite credential based authentication also functions when the user is adorning face masks for preventing spread of germs. As a result of the benefits of the present invention, the user can execute electronic activities using resource processing devices in a reliable, efficient and convenient manner, with increased security in the electronic activity both for the user and the entity associated with the electronic activity.

In general, embodiments of the present invention relate to electronic systems, apparatuses, methods and computer program products for construction and detection of spatial movements in a virtual reality (VR) space for performance of electronic activities. A resource processing device may be provided, such that the resource processing device is associated with or equipped with a VR composite credential authentication device for retrieving VR composite credentials of a user. In this regard, in some embodiments, the VR composite credential authentication device may be a built-in feature of the resource processing device. In other embodiments, a stand-alone VR composite credential authentication device is provided that is configured to establish an operative communication channel with the resource processing device to transmit the VR composite credentials received from the user.

Referring to FIG. 1, a block diagram illustrating an authentication technology environment 100 configured for facilitating a user activity via a VR composite credential authentication device 160 is shown. As illustrated, the authentication technology environment 100 may comprise one or more resource processing devices 120, one or more VR composite credential authentication devices 160, a processing system 140, one or more user devices 104, an VR composite credential authentication database 108, and/or an entity system 190 (also referred to as a third party system 190) in operative communication via a network 101. The authentication technology environment 100 may include a VR composite credential authentication device 160 and/or a resource processing device 120 operated by a user 102 who may be a customer who wants to perform an electronic activity or user activity (e.g., a transaction).

Typically, the processing system 140 and the VR composite credential authentication database 108 are in electronic communication with the VR composite credential authentication device 160, either directly or through the resource processing device 120, via the network 101, which may be the Internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network.

In some embodiments, the VR composite credential authentication device 160 may be a stand-alone device that is configured to facilitate the electronic/user activity, at least in part. In this regard, in some instances, the VR composite credential authentication device 160 is configured to be coupled to, or establish operative communication with a resource processing device 120, such that the user 102 may conduct an electronic/user activity via the VR composite credential authentication device 160 and/or the resource processing device 120. Here, the VR composite credential authentication device 160 may be configured establish communication with other systems via network 101, either directly or via the resource processing device 120. In other instances, where the VR composite credential authentication device 160 may be configured to facilitate electronic/user activities, the terms VR composite credential authentication device 160 and the resource processing device 120 may be used interchangeably.

In other instances the VR composite credential authentication device 160 may be integral with the resource processing device 120. As such, in some embodiments, the authentication technology environment may comprise the resource processing device 120, in communication with other systems via the network 101, as illustrated by FIG. 1. Therefore, the resource processing device 120 may refer to one or more resource processing devices or transaction terminal devices that are configured to be associated with or connected to the VR composite credential authentication device 160, that are associated or connected to a VR composite credential authentication device 160 and/or that comprise the VR composite credential authentication device 160. The resource processing device 120 may comprise an ATM 120a, a resource terminal 120b (e.g., a point of sale terminal 120b), a user device 120c, vending machines and/or other devices that are configured to facilitate the user activity. The user device 120c may be one of the user devices 104 and may comprise a mobile communication device, such as a cellular telecommunications device (i.e., a smart phone or mobile phone), a computing device such as a laptop computer, a personal digital assistant (PDA), a mobile Internet accessing device, or other mobile device including, but not limited to portable digital assistants (PDAs), pagers, mobile televisions, entertainment devices, laptop computers, cameras, video recorders, audio/video player, radio, GPS devices, any combination of the aforementioned, or the like.

As illustrated in FIG. 1, the processing system 140 may include a communication device 144, a processing device 142, and a memory device 150 having an authentication module 154, a processing system application 156 and a processing system datastore 158 stored therein. As shown, the processing device 142 is operatively connected to and is configured to control and cause the communication device 144, and the memory device 150 to perform one or more functions. Furthermore, the processing device 142 is typically configured to control and cause the processing device 122 of the resource processing device 120, and the VR composite credential authentication device 160 to perform one or more functions. In some embodiments, the authentication module 154 and/or the processing system application 156 comprises computer readable instructions that when executed by the processing device 152 cause the processing device 142 to perform one or more functions and/or transmit control instructions to the resource processing device 120, the VR composite credential authentication device 160, the VR composite credential authentication database 108, the entity system 190, and/or the communication device 144. It will be understood that the authentication module 154 and/or the processing system application 156 may be executable to initiate, perform, complete, and/or facilitate one or more portions of any embodiment described and/or contemplated herein, and specifically embodiments directed to electronic activities and authentication of users therefor. The authentication module 154 may comprise executable instructions associated with one or more authentication steps of electronic activities, and may be embodied within the processing system application 156 in some instances. The processing system 140 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for electronic activities. In accordance with embodiments of the invention, the term "financial institution" refers to any organization in the business of moving, investing, or lending money, dealing in financial instruments, or providing financial services.

The communication device 144 may generally include a modem, server, transceiver, and/or other devices for communicating with other devices on the network 101. The network communication device 144 may be a communication interface having one or more communication devices configured to communicate with one or more other devices on the network 101, such as the processing system 140, other processing systems, data systems, etc.

Additionally, referring to processing system 140, the processing device 142 may generally refer to a device or combination of devices having circuitry used for implementing the communication and/or logic functions of the processing system 140. For example, the processing device 142 may include a control unit, a digital signal processor device, a microprocessor device, and various analog-to-digital converters, digital-to-analog converters, and other support circuits and/or combinations of the foregoing. Control and signal processing functions of the system 140 may be allocated between these processing devices according to their respective capabilities. The processing device 142 may further include functionality to operate one or more software programs based on computer-executable program code thereof, which may be stored in a memory device 130, such as the processing system application 156 and the authentication module 154. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 142 may be configured to use the network communication interface of the communication device 144 to transmit and/or receive data and/or commands to and/or from the other devices/systems connected to the network 101.

Furthermore, a "user interface" (not illustrated) may be associated with the processing system 140 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 140. As another example, the user interface may be provided on the resource processing device 120, such as user interface 126, that may be controlled by the processing system 140 either directly or via the processing device 122 of the resource processing device 120.

The memory device 150 within the processing system 140 may generally refer to a device or combination of devices that store one or more forms of computer-readable media for storing data and/or computer-executable program code/instructions. For example, the memory device 130 may include any computer memory that provides an actual or virtual space to temporarily or permanently store data and/or commands provided to the processing device 142 when it carries out its functions described herein. The processing system 140 may be used by a third party/entity 190 to interact with the resource processing device 120, based on providing requisite authorization.

As further illustrated in FIG. 1, the resource processing device 120 may include a communication device 124, a processing device 122, a user interface 126, a VR composite credential authentication device 160 and a memory device 130 having an authentication application/module 134, a resource datastore 136 and one or more processing applications 132 stored therein. The processing system 140 is typically configured to transmit control instructions to, and cause the processing device 122 to perform one or more steps of the embodiments presented herein. As shown, the processing device 122, in turn, is operatively connected to and is configured to control and cause the communication device 124, the user interface 126, the VR composite credential authentication device 160 and the memory device 130 to perform one or more functions, at least in part. In some embodiments, the processing applications 132 and/or the authentication application 134 comprises computer readable instructions that when executed by the processing device 122 cause the processing device to perform one or more functions and/or transmit control instructions to the VR composite credential authentication device 160, the communication device 124, the user interface 126, and the memory device 130.

The communication device 124 may comprise a modem, server, transceiver, and/or other device for communicating with other devices and systems on a network. The communication device 124 may further comprise a contact, contactless, wireless and/or wired interface that is configured to establish communication between the VR composite credential authentication device 160 and the resource processing device 120, as particularly the processing device 122 and in turn the processing system 140.

The user interface 126 of the resource processing device 120 may include a display (e.g., a liquid crystal display, a touchscreen display, and/or the like) which is operatively coupled to the processing device 122. The user interface 126 may include any number of other devices allowing the resource processing device 120 to transmit/receive data to/from a user, such as a keypad, keyboard, touch-screen, touchpad, microphone, mouse, joystick, other pointer device, button, soft key, and/or other input device(s). The user interface 126 may further comprise output devices including a display that provides instructions in information regarding the user activity and VR composite authentication steps associated with the user activity. In some embodiments where the resource processing device 120 requests the user's signature (if needed), the display may also serve as a touchpad input device to input the user's signature via a stylus. Other output devices may include one or more LEDs or an audio speaker, both which may indicate to the user that data has been successfully received from the VR composite credential authentication device 160. A printer that can print paper receipts may also be incorporated into the resource processing device 120.

As further illustrated in FIG. 1, the memory device 130 may include processing applications 132 and authentication module 134. In some embodiments, the processing applications 132 and/or the authentication module 134 may be executable to initiate, perform, complete, and/or facilitate one or more portions of any embodiment described and/or contemplated herein, either independently or in response to receiving control instructions from the processing system 140. In some instances the authentication module 134 is a part of the processing applications 132. Generally, the processing application 132 is executable to receive activity instructions and/or authentication credentials from the user and perform typical resource processing device functions.

The resource processing device 120 may require users to identify and/or authenticate themselves before the resource processing device 120 may initiate, perform, complete, and/or facilitate an electronic activity. For example, in some embodiments, the resource processing device 120 is configured (and/or the processing application 132 is executable) to authenticate a user based at least partially on a debit card, smart card, token (e.g., USB token, etc.), username, password, PIN, biometric information, and/or one or more other credentials that the user presents to the resource processing device 120. Additionally or alternatively, in some embodiments, the resource processing device 120 is configured to authenticate a user by using one-, two-, or multi-factor authentication. For example, in some embodiments, the resource processing device 120 requires two-factor authentication, such that the user must provide a valid debit card and enter the correct PIN associated with the debit card in order to authenticate the user to the resource processing device 120. However, either alternatively or in addition to the aforementioned authentication features, the resource processing device 120 may require VR composite credential authentication of the user 102 before initiating, performing, completing, and/or facilitating a user activity, as will be described in detail with respect to various embodiments of the invention.

Figure 2:
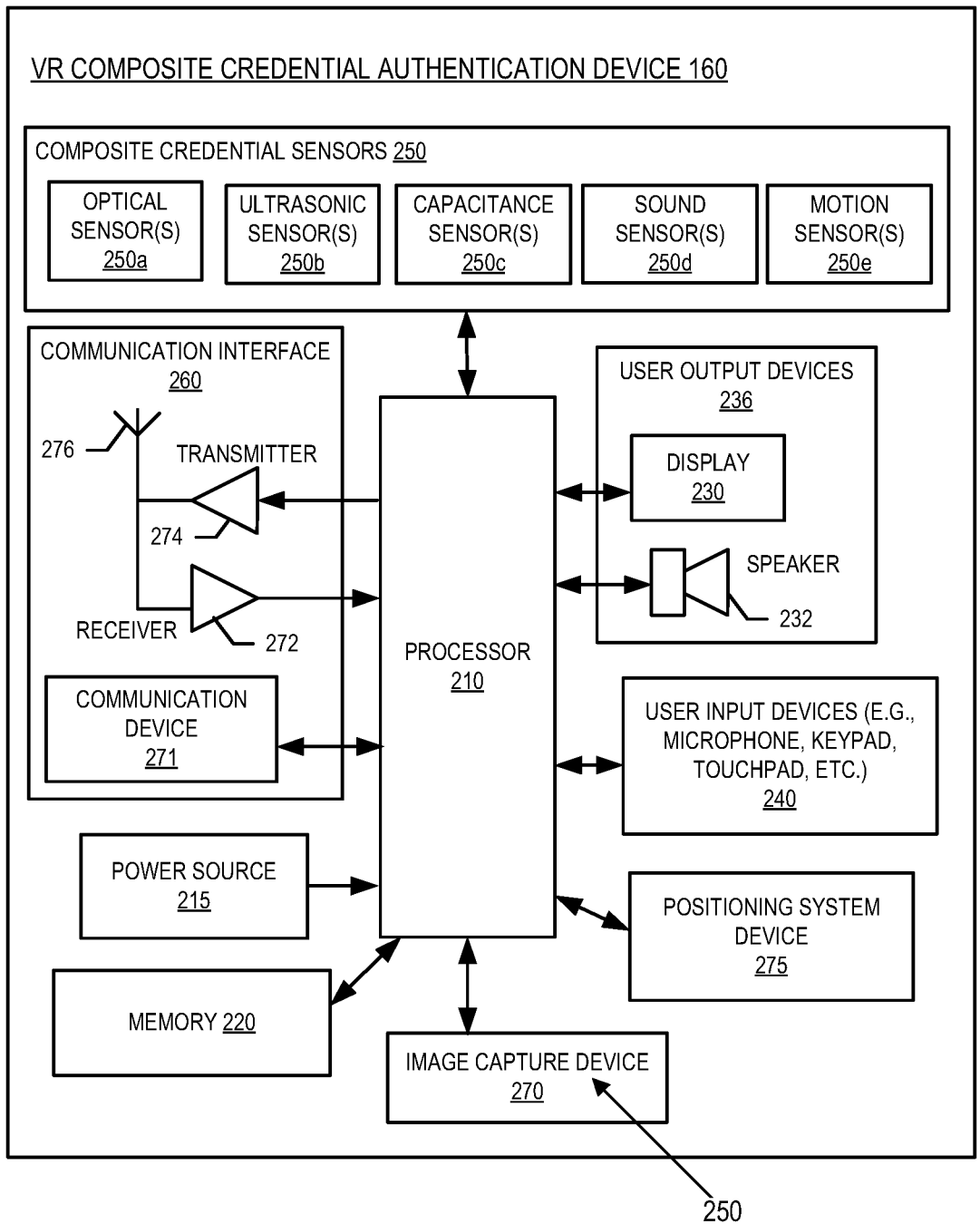
FIG. 2 illustrates a schematic block diagram representation 200 of a VR composite credential authentication device 160, in accordance with an embodiment of the invention.

Referring now to FIG. 2, one embodiment of the VR composite credential authentication device 160 is illustrated. The VR composite credential authentication device 160 is structured for capturing, customizing and transforming one or more VR composite credentials of a user and authenticating electronic activities based on at least the VR composite credentials. In accordance with the embodiments of the invention, the term "VR composite credentials" may refer to spatial movement and position credentials of the user's body that may be used to identify users and/or verify the identity of the user. In some embodiments, the spatial movement and position credentials may refer to the position, location, movement, gestures and/or the like of the user's phalanges, i.e., the user's hand(s) and/or finger(s). In some embodiments, the spatial movement and position credentials may refer to the position, location, movement, gestures and/or the like of other body parts of the user such as the user's feet, arms, head, legs, etc. In some embodiments, the VR composite credentials may refer to a combination of spatial movement and position credentials of the user's body and one or more biometric credentials of the user such (i) a facial image credential, (ii) a user voice credential, and/or (iii) a user verbal phrase credential. In some embodiments the one or more biometric credentials may further comprise iris recognition, retina scans, fingerprints, finger veins, palm veins, palm prints, digital bone anatomy/structure and positioning (distal phalanges, intermediate phalanges, proximal phalanges, and the like). In some embodiments, the VR composite credentials are non-tactile, i.e., not based on touch or contact between the user and components/devices, for authenticating the user.

The VR composite credential authentication device 160 is typically configured to receive VR composite credentials from the user 102. In this regard, the VR composite credential authentication device 160 may comprise one or more composite credential sensor devices 250. The one or more composite credential sensor devices 250 are configured to retrieve, receive, analyze and or validate VR composite credentials associated with the user. Here, the one or more composite credential sensors 250 may comprise (i) one or more VR spatial sensor devices configured for capture and imaging of VR spatial movement and position credentials, and (ii) one or more biometric sensor devices configured for capturing one or more biometric credentials of the user.

In this regard, one or more VR spatial sensor devices may comprise optical sensors 250*a*, ultrasonic sensors 250*b*, capacitance sensors 250*c*, motion sensors 250*e*, image capture devices 270 such as cameras, and/or the like, which singularly or in combination capture spatial movement and position type VR composite credentials. The one or more one or more VR spatial sensor devices may further comprise radio frequency, thermal, pressure, piezoresistive/piezoelectric, microelectromechanical sensors, and the like. Moreover, the one or more biometric sensor devices may comprise optical sensors 250*a*, ultrasonic sensors 250*b*, capacitance sensors 250*c*, sound sensors 250*d* (e.g., sound/audio capture devices), fingerprint scanners, iris scanners, vital sign monitors, etc.

As outlined previously, authentication using VR composite credentials of the user may comprise the spatial movement and position credentials referring to the position, location, movement, gestures and/or the like of the user's phalanges, i.e., the user's hand(s) and/or finger(s). As such, the VR composite credential authentication device 160 may comprise the sensors 250 scanning/identifying/determining one or more phalanges/fingers and/or hand of the user positioned appropriately proximate to the composite credential sensors 250 and/or in a predetermined capture region proximate the composite credential sensors 250 (e.g., capture region 330 illustrated in FIGS. 3B and 3C). In this regard, the user may choose to provide/scan one or more phalanges/fingers/hands simultaneously, consecutively, in a pattern, in a predetermined sequence, make certain gestures, and/or move them to trace a particular symbol/shape, consecutively, in a pattern, in a predetermined sequence. The composite credential sensors 250 are typically configured to identify, recognize, and/or analyze the VR composite credentials provided in the aforementioned ways. The composite credential sensors 250 are also typically configured to identify, recognize, and/or analyze the VR composite credentials associated with other body parts of the user such as the user's arms, legs, feet, torso, face, etc., and biometric credentials such as voice phrase, iris scans, face scans, etc.

The one or more composite credential sensors 250, either singularly or in combination may be configured to recognize/receive the VR composite credentials of the user and also determine one or more credential parameters associated with the VR composite credentials. Credential parameters typically comprise characteristics of the VR composite credentials provided by the user. In this regard, determining credential parameters may comprise determining positioning and orientation of the phalanges/fingers/hands of the user (e.g., by determining one or more mechanical degree of freedom coordinate parameters 320 of the fingers and/or hands, as illustrated in FIGS. 3B-3E), identifying the fingers/hands, determining a sequence and/or timing of the movement of the user's hands and/or fingers (e.g., by determining and tracking the paths traced by one or more mechanical degree of freedom coordinate parameters 320 of the fingers and/or hands, as illustrated in FIGS. 3B-3E), determining gestures formed by the user's hands/fingers (e.g., as illustrated in FIG. 3F), determining dimensional parameters (such as size of hands, distance between the hands, distance between a hand and the head, etc.), determining symbols traced by the movement of the movement of the user's hands and/or fingers (e.g., by determining and tracking the paths traced by one or more mechanical degree of freedom coordinate parameters 320 of the fingers and/or hands, as illustrated in FIGS. 3B-3E), and/or the like.

In some embodiments, the phalangeal credential sensor 250 comprises an interface for the user to provide VR composite credentials. In some embodiments, the one or more phalangeal credential sensors may comprise a common interface for receiving the credentials, while in other embodiments the phalangeal credential sensors may comprise multiple interfaces. In some instances, the interface takes the form of a screen of predetermined dimensions for the users to place their phalanges/fingers in front of the screen and the screen may display whether or not the user's fingers/hands or other body parts are correctly located within the capture region 330. In some embodiments, this screen may be the display device 230. This screen may be connected to one or more composite credential sensors 250, such that the sensors 250 may the VR composite credentials and the credential parameters. The screen may be manufactured from any suitable material or a combination of materials, for example glass, plastics, metals, crystals (such as laser-cut sapphire crystal to preclude scratches), composites, non-metals and the like. In some instances, the screen comprises a detection interface such that it is configured to detect the user's fingers/phalanges even when the user is not pressing on the screen or even when the user is not applying the predetermined pressure required for conventional fingerprint scanners when placing his/her fingers on the screen for retrieval of VR composite credentials. In some instances, as discussed above, the interface takes the form of a contactless interface that is configured to retrieve one or more VR composite credentials and/or determine one or more credential parameters without physical contact between the user's phalanges/fingers and the interface. In this regard, the contactless interface may employ light waves, radio waves, and ultrasonic waves.

Optical sensors 250*a* typically involve optical imaging of the features of the user's phalanges/fingers/hands or other body parts using visible light. For example, the optical sensor 250*a* may capture a digital image of a phalanges/fingers/hands or other body parts. In some embodiments, the optical sensor 250 may comprise a layer for the user to place the phalanges/fingers/hands or other body parts above it, and such that a light-emitting phosphor layer underneath can illuminating the phalanges/fingers/hands or other body parts. The light reflected from the phalanges/fingers/hands or other body parts may pass through the phosphor layer to an array of a capacitor-based imaging device which captures a visual image used to capture VR composite credentials and determine credential parameters. For example, multiple images may be generated in a predetermined frequency to determine the pattern or movement paths of the user's phalanges/fingers/hands or other body parts. In other embodiments, the optical sensor 250*a* may comprise an interface or terminal containing near-infrared LED (light-emitting diode) light and a monochrome capacitor-based imaging camera. This type of optical sensor may also be used for finger vein recognition, since the hemoglobin in the body vessels absorbs near-infrared LED light, which makes the vein system appear as a dark pattern of lines that may be captured as an image for authentication of the user.

Ultrasonic sensors 250*b* typically involve creating visual images of the VR composite credentials using high frequency sound waves. The dermal layer of the user's skin may reflect the sound waves, which may be captured to form an image of the phalanges/fingers/hands or other body parts, capture VR composite credentials and determine credential parameters. The high frequency sound waves may be generated using piezoelectric transducers.

Capacitance Sensors 250*c* typically involve capturing images of the VR composite credentials using the properties of a parallel plate capacitor. The capacitance sensors 250*c* typically comprise a sensor array pixels that each act as one plate of a parallel plate capacitor, while the electrically conductive dermal layer of skin acts as the second plate of the parallel plate capacitor. The capacitance sensor 250*c* is configured to determine the varying capacitance between the valleys and ridges of the dermal layer to generate the image, such as a fingerprint, for authentication. The change in measured capacitance may also be utilized to determine credential parameters. The capacitance sensors 250*c* may comprise active and/or passive capacitance sensors.

Sound sensors 250*d* may comprise sound/audio capture devices, voice recognition devices, microphones, and/or the like. Motion sensors 250*e* may comprise geolocation sensors (e.g., GPS sensors), accelerometer sensors, pedometer sensors, tilt sensors, gravimeter sensors, inclinometer sensors, gyroscopes, and/or other sensors/devices which, singularly or in combination, determine motion (and its parameters such as direction, speed, acceleration, path, etc.), orientation, positioning, location and/or the like of the user and/or the user's body parts (e.g., hands etc.).

In some embodiments, the VR composite credential authentication device 160 may be a wearable device associated with the user. In this regard, the VR composite credential authentication device 160 may comprise a VR headset, a VR handheld controller, a smartwatch, a entertainment controller, and/or the like, and/or mobile devices, portable devices, and/or the like. In some embodiments, the positioning system device 275 of the VR composite credential authentication device 160 may comprise GPS devices, accelerometers, and/or the like.

The VR composite credential authentication device 160 may further include various features, such as a processor 210, such as a processing device or a microprocessor, communicably coupled to the composite credential sensors 250, a memory device 220, user output devices 236, user input devices 240, a network communication interface 260 comprising a communication device 271, and/or a power source 215. Optionally, in other embodiments, the processor 210 may be coupled to other features of the VR composite credential authentication device 160 such as an image capture device 270, a positioning system device 275, and the like. In the embodiments where the VR composite credential authentication device 160 is integral with the resource processing device 120, the memory device 220 may refer to the memory device 130, the processor 210 may refer to the processing device 122, the network communication interface 260 may refer to the communication device 124 and/or the user output devices 236 and user input devices 240 may refer to the user interface 126. In some embodiments, the user output devices 236 may comprise one or more display devices 230 and one or more speaker devices 232.

Typically, the communication device 271 of the network communication interface 260 is configured to establish operative communication between the VR composite credential authentication device 160 and the processing device 122 of the resource processing device 120. In this regard, the communication interface 260 comprises a transmitter 274, a receiver 272 to transmit and receive signals from corresponding devices of the communication device 124 of the resource processing device 120 via a suitable transmission medium or a communication channel. In some embodiments, the stand-alone VR composite credential authentication device 160 is configured to be coupled/connected to the resource processing device 120 via wired communication channel. For example, the communication device 271 may comprise a plug that may be inserted into a complementary port on resource processing device 120. In other embodiments, the stand-alone VR composite credential authentication device 160 is configured to be coupled/connected to the resource processing device 120 via a wireless and/or contactless communication channel. In this regard, the wireless communication channel may comprise near field communication (NFC), communication via radio waves, communication through the internet, communication via electromagnetic waves and the like. In one embodiment, the resource processing device 120 may include a transceiver, i.e., one or more antennas 276 and and/or other electronic circuitry, devices, and software, for receiving VR composite credential data when the VR composite credential authentication device 160 is held close to or tapped at a suitable location of the resource processing device 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 at the mobile device may transmit and receive radio frequency signals, respectively, from the resource processing device 120 within a distance of up to approximately 25 cm, and preferably from 0-20 cm, such as from 0-15 cm, and 0-10 cm.

Establishing the communication channels may also include signaling information in accordance with the air interface standard of the applicable cellular system of the wireless telephone network that may be part of the network 101. In this regard, the VR composite credential authentication device 160 may be configured to operate with one or more air interface standards, communication protocols, modulation types, and access types. By way of illustration, the VR composite credential authentication device 160 may be configured to operate in accordance with any of a number of first, second, third, and/or fourth-generation communication protocols and/or the like. For example, the VR composite credential authentication device 160 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The VR composite credential authentication device 160 may also be configured to operate in accordance with non-cellular communication mechanisms, such as via a wireless local area network (WLAN) or other communication/data networks.

Figure 3A:
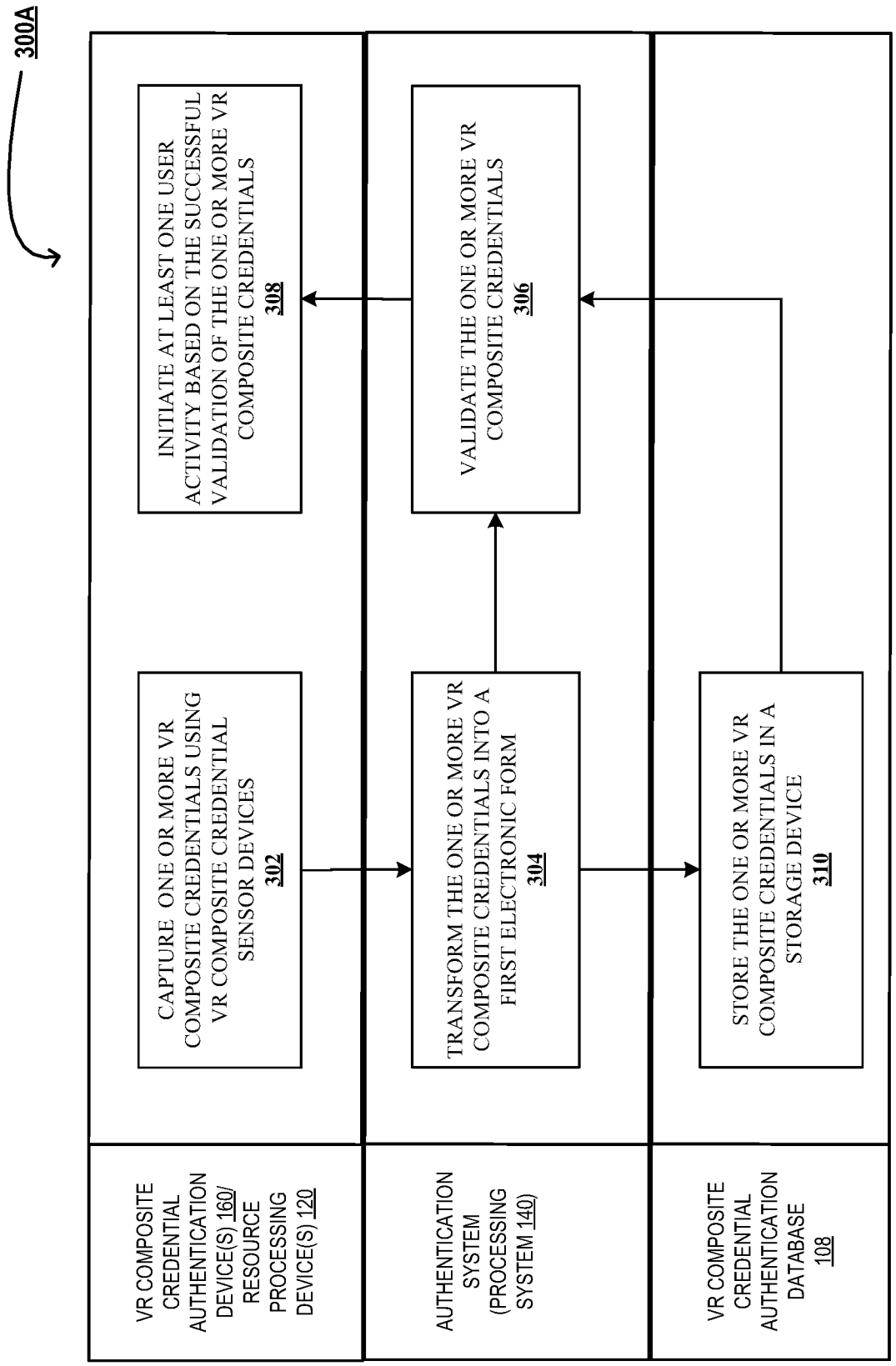
FIG. 3A illustrates a block diagram illustrating a high level process flow 300A for VR composite credential authentication of a user, in accordance with an embodiment of the invention.
Figure 3B:
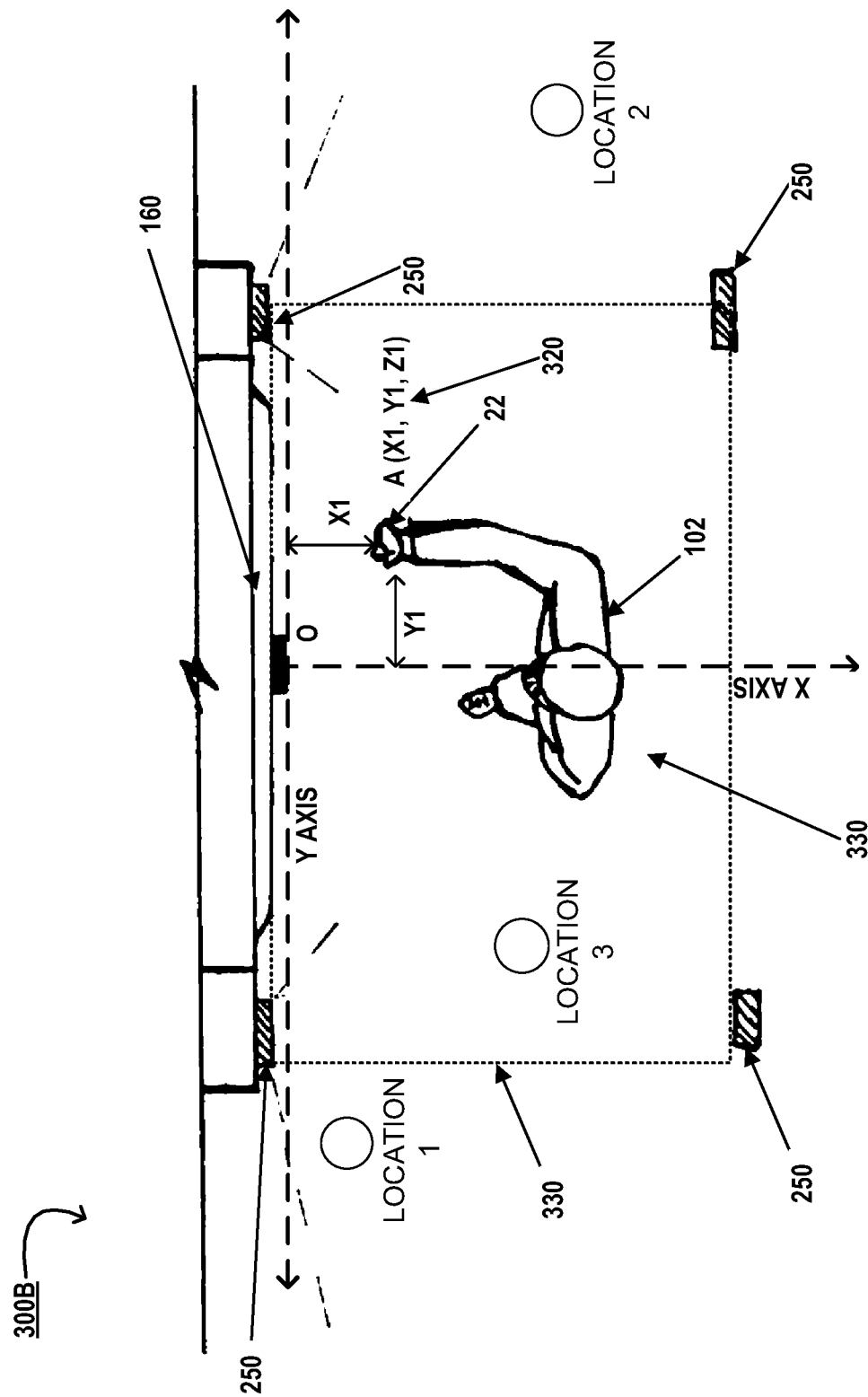
FIG. 3B illustrates a top view schematic representation 300B of VR composite credential authentication of a user, in accordance with an embodiment of the invention.
Figure 3C:
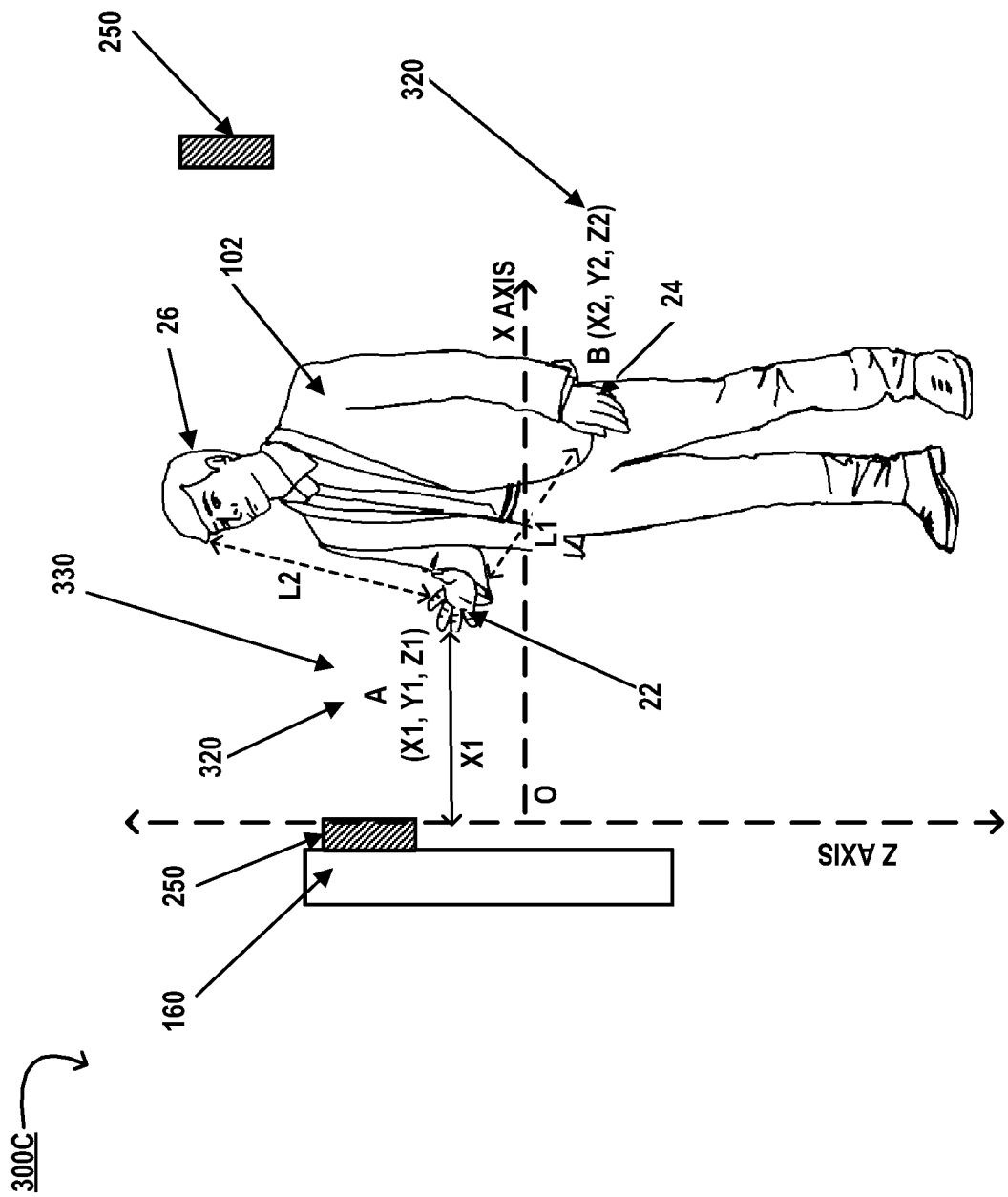
FIG. 3C illustrates a side view schematic representation 300C of VR composite credential authentication of a user of FIG. 3B, in accordance with an embodiment of the invention.

Referring now to FIG. 3A, illustrating a high level process flow 300A for VR composite credential authentication of the user. FIG. 3B illustrates a top view schematic representation 300B of VR composite credential authentication of a user, in accordance with an embodiment of the invention. FIG. 3C illustrates a side view schematic representation 300C of VR composite credential authentication of a user of FIG. 3B, in accordance with an embodiment of the invention. FIG. 3D illustrates a schematic representation 300D of VR composite credentials associated with phalanges of a user in a first position, in accordance with an embodiment of the invention. FIG. 3E illustrates a schematic representation 300E of VR composite credentials associated with phalanges of a user of FIG. 3D in a second position, in accordance with an embodiment of the invention. FIG. 3F illustrates a schematic representation 300F of VR composite credentials associated with phalanges of a user of FIG. 3F in a third position, in accordance with an embodiment of the invention. In some embodiments, the "system" or the "authentication system" as used henceforth, may refer to the processing system 140, such that the processing system 140 may perform some of all the steps of process flow 300A herein. In other embodiments, the "system" may refer to the processing system 140, in conjunction with the resource processing device 120, the VR composite credential authentication device 160 and/or other systems that are configured to initiate one or more steps of the process flows described herein. The steps of the process flow 300A will be described with respect to the non-limiting illustrative examples illustrated in FIGS. 3B-3F.

At block 302, the system typically captures one or more VR composite credentials using one or more composite credential sensor devices 250. In this regard, the system may transmit control signals to the one or more composite credential sensor devices 250, which are configured to cause the one or more composite credential sensor devices 250 to capture the one or more VR composite credentials of the user.

As outlined previously, authentication using VR composite credentials of the user may comprise (i) the spatial movement and position credentials referring to the position, location, movement, gestures and/or the like of the user's phalanges, i.e., the user's hand(s) and/or finger(s) or other body parts of the user and/or (ii) biometric credentials. As such, the VR composite credential authentication device 160 may comprise the sensors 250 for scanning/identifying/determining the user's body portions and their parameters (one or more phalanges/fingers and/or hand of the user, the user's head, the user's limbs, feet, etc.). Specifically, in the non-limiting example illustrated in FIGS. 3B and 3C, the VR composite credential authentication device 160 may comprise a plurality of sensors 250. Each of the sensors 250 or the sensors 250 collectively may define a capture region 330. For instance, the capture region may be 0.5 to 100 cubic feet, 1 to 200 cubic feet, and/or the like. As such, the sensors 250 may scan/identify/determine the user 102's body portions (one or more phalanges/fingers and/or hand of the user, the user's head, the user's limbs, feet, etc.) positioned appropriately proximate to the composite credential sensors 250 (e.g., within a predetermined range of 1-5 feet etc.) and/or in the predetermined capture region 330 proximate the composite credential sensors 250. Similarly, in the instances of capturing biometric credentials, the biometric type sensors 250 may scan/identify/determine biometric credentials of the user (e.g., voice recognition, iris scans, etc.) when the user is positioned appropriately proximate to the composite credential sensors 250 (e.g., within a predetermined range of 1-5 feet etc.) and/or in the predetermined capture region 330 proximate the composite credential sensors 250. FIGS. 3B and 3C illustrate the user being located within the predetermined capture region 330. As another example, "location 3" may fall within the predetermined capture region 330 as illustrated. However, upon determining that the user 102 or a portion of the user's body (e.g., right hand 22) fall outside the predetermined capture region 330 (e.g., at "location 1" or "location 2" as illustrated), the system may request the user to reposition such that the user is located within the predetermined capture region 330.

In this regard, the user 102 may provide VR composite credentials in the form of spatial movement and position credentials by (i) positioning the right hand 22 (and/or fingers of the right hand 22) in a particular position, (ii) forming a particular gesture with the right hand 22 (and/or fingers of the right hand 22), (iii) moving the right hand 22 (and/or fingers of the right hand 22) simultaneously, consecutively, in a pattern, in a predetermined sequence, (iv) moving the right hand (and/or fingers of the right hand 22) to trace a particular symbol/shape, consecutively, in a pattern, in a predetermined sequence, and/or the like. Similarly, the user 102 may provide VR composite credentials in the form of spatial movement and position credentials using other body parts of the user such as the user's left hand 24, the user's head 26, and/or the like. In some embodiments, the VR composite credentials in the form of spatial movement and position credentials may comprise credentials provided using a combination of body parts, e.g., provided using both the hands 22-24, provided using the right hand 22, and the head 26, a specific combination of fingers, etc. The composite credential sensors 250 are typically configured to identify, recognize, and/or analyze the VR composite credentials provided in the aforementioned ways. The composite credential sensors 250 are also typically configured to identify, recognize, and/or analyze the VR composite credentials associated with other body parts of the user such as the user's arms, legs, feet, torso, face, etc. The biometric type sensors 250 may also capture biometric credentials such as voice phrase, iris scans, face scans, etc. in a similar manner.

The one or more composite credential sensors 250, either singularly or in combination may be configured to recognize/receive the VR composite credentials of the user and also determine one or more credential parameters associated with the VR composite credentials. Credential parameters typically comprise characteristics of the VR composite credentials provided by the user. In this regard, determining credential parameters may comprise determining positioning and orientation of the phalanges/fingers/hands of the user (e.g., by determining one or more mechanical degree of freedom coordinate parameters 320 of the fingers and/or hands), identifying the fingers/hands, determining a sequence and/or timing of the movement of the user's hands and/or fingers (e.g., by determining and tracking the paths traced by one or more mechanical degree of freedom coordinate parameters 320 of the fingers and/or hands), determining gestures formed by the user's hands/fingers, determining dimensional parameters (such as size of hands, distance between the hands, distance between a hand and the head, etc.), determining symbols traced by the movement of the movement of the user's hands and/or fingers (e.g., by determining and tracking the paths traced by one or more mechanical degree of freedom coordinate parameters 320 of the fingers and/or hands), and/or the like.

In this regard, in some embodiments, the system may establish a coordinate system predetermined capture region 330. FIGS. 3B-3C illustrate a cartesian coordinate system having mutually perpendicular axes X, Y, and Z, which intersect at an origin "0". It is noted that other coordinate systems such as polar coordinate systems may also be employed in alternative embodiments. The location/positional coordinates of the user's right hand 22 at a first time may be indicated by cartesian positional parameters A (X1, Y1, Z1) with X1 representing the distance from the X-axis, Y1 representing the distance from Y-axis and Z1 representing the distance from the Z-axis. The system may similarly determine cartesian positional parameters B (X2, Y2, Z2) of the user's left hand 22, the user's head 26, etc. The cartesian positional parameters may also be referred to as spatial position-movement credentials or spatial position credentials.

As illustrated by FIGS. 3D-3F, the system may further determine cartesian positional parameters (i.e., spatial position-movement credentials or spatial position credentials) of the user's fingers. Specifically, FIG. 3D illustrates, the fingers of the user's right hand 22 having the following positional parameters 22A (Xa, Ya, Za), 22B (Xb, Yb, Zb), 22C (Xc, Yc, Zc), 22D (Xd, Yd, Zd), and 22E (Xe, Ye, Ze) at a first position. Based on analyzing these positional parameters, the system may determine that this particular positioning of the figures reflects a first gesture performed by the user. FIG. 3E illustrates, the fingers of the user's right hand 22 having the positional parameters such as 22D' (Xd', Yd', Zd') and 22E' (Xe', Ye', Ze') at a second position. Based on analyzing these positional parameters, the system may determine that this particular positioning of the figures reflects a second gesture performed by the user. FIG. 3F illustrates, the fingers of the user's right hand 22 having the positional parameters such as 22E" (Xe", Ye", Ze") at a third position. Based on analyzing these positional parameters, the system may determine that this particular positioning of the figures reflects a third gesture performed by the user.

The one or more mechanical degree of freedom coordinate parameters 320 (also referred to as spatial position-movement credentials or spatial movement credentials) may refer to independent parameters that define the configuration or state of the user's body portions. In some embodiments, the one or more mechanical degree of freedom coordinate parameters 320 may define the position and orientation of the user's body portions in space. As such, the one or more mechanical degree of freedom coordinate parameters 320 may comprise three translational parameters and three rotational parameters. The one or more mechanical degree of freedom coordinate parameters 320 may be determined with respect to the coordinate system. For instance, with respect to the illustrated cartesian coordinate system, the one or more mechanical degree of freedom coordinate parameters 320 may comprise a first translational parameter along the X-axis, a second translational parameter along the Y-axis, third translational parameter along the Z-axis, a first rotational parameter along the X-axis (e.g., parameter R1 illustrated in FIG. 3D), a second rotational parameter along the Y-axis, and/or third rotational parameter along the Z-axis (e.g., parameter Si illustrated in FIG. 3D). It is noted that, the system may determine that one or more of these degree of freedom coordinate parameters may be constrained for a particular body portion (e.g., the wrist may be rotated only along a particular rotational axis and not all 3), and subsequently the system may decrease the number of mechanical degree of freedom coordinate parameters 320 determined. The system may track the movement ((a) translation and (b) rotation) of the user's right hand 22 from A (X1, Y1, Z1) at the first time to another position A' (X1', Y1', Z1') at a subsequent second time (not illustrated). In this regard, the system may construct vectors and vector paths relating to the translation of the user's right hand 22 and rotation of the user's right hand 22 mapping the movement and path followed from A (X1, Y1, Z1) at the first time to another position A' (X1', Y1', Z1') at a subsequent second time. Here, the vectors represent the movement along the degrees of freedom, e.g., translation along the X-axis, translation along the Y-axis, translation along the Z-axis, rotation along the X-axis, rotation along the Y-axis, and/or rotation along the Z-axis.

In this manner, using the cartesian positional parameters, the system my further determine one or more dimensional parameters such as a size parameter and/or a distance parameter. The size parameter may comprise a maximum width of the user's hand, a maximum width of the user's head, and/or the like. The system may determine the size parameter as an Euclidean distance between the extreme points of the body portion being analyzed. The distance parameter may comprise a distance between (i) two body portions of the user, and/or (ii) a body portion of the user and one/or more sensors 250. The system may determine the distance parameter as an Euclidean distance between the points of the body portions being analyzed. For example, the system may determine a distance parameter "L1" reflecting a distance between the right hand 22 and the left hand 24 of the user 102. Similarly, the system may determine a distance parameter "L2" reflecting a distance between the right hand 22 and the head 26 of the user 102.

Similarly, using the positional parameters and the one or more mechanical degree of freedom coordinate parameters 320, the system may trace the path followed by the user's body portion to determine a symbol parameter associated with the movement. For example, the system parameter may refer to a symbol traced by the one or more spatial position-movement credentials (e.g., positional parameters). For example, the system may determine that a movement performed by the user's right hand 22 traces a generally "O" shape, a "V" shape, etc.

Next, at block 304, the VR composite authentication process 300 involves the transformation of the one or more VR composite credentials into a first electronic form. In this regard, the system may fundamentally transform the captured VR composite credentials to an electronic format that is configured to allow searching, granular formatting, comparison, validation and the like, as described with respect to FIGS. 4 and 5. Typically, the authentication process 300 involves registration and/or enrollment of the user for at least an initial time, so that the system may receive, record and store the VR composite credentials of the user, as described in detail with respect to FIG. 4. After registration, the authentication system may then store the one or more VR composite credentials in a storage device such as the VR composite credential authentication database 108, as illustrated by block 310. These stored one or more VR composite credentials or "reference" VR composite credentials, may then be used to authenticate future user activities. In this regard, the authentication system may perform validation of the one or more captured VR composite credentials at 302 in light of the registered reference VR composite credentials, as illustrated by block 306. Subsequently, at block 308, the system may initiate at least one user activity, by transmitting control signals to the resource processing device 120, based at least on the successful validation of the one or more VR composite credentials, as will be described later on with respect to FIG. 6.

Figure 4:
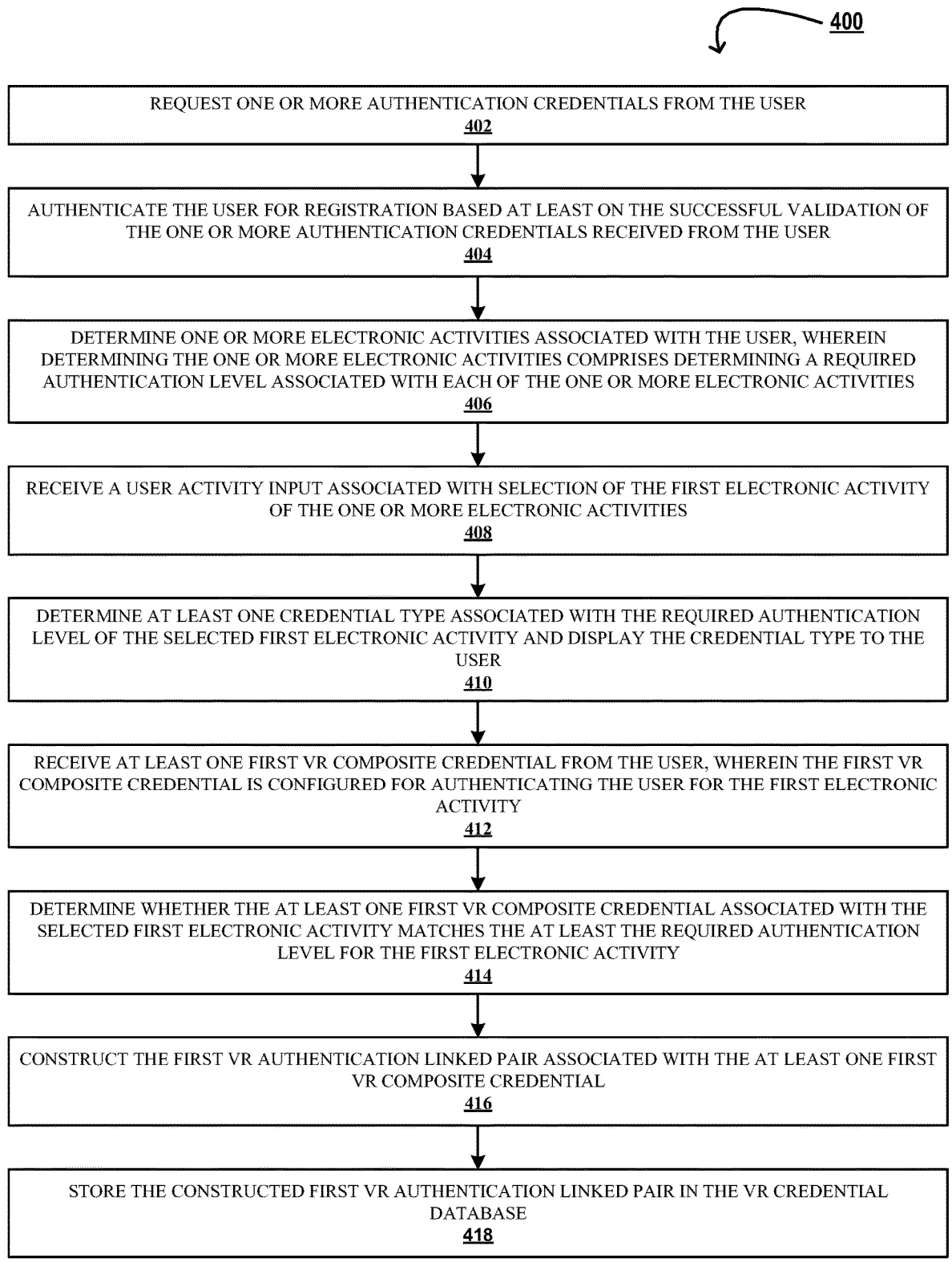
FIG. 4 illustrates a block diagram depicting a high level process flow 400 for registration of the user's VR composite credentials, in accordance with an embodiment of the invention.

Referring now to FIG. 4, illustrating a high level process flow 400 for customizable registration of the user's VR composite credentials at an initial time. In some embodiments, the "system" or the "authentication system" as used henceforth, may refer to the processing system 140, such that the processing system 140 may perform some of all the steps of process flow 400 herein. In other embodiments, the "system" may refer to the processing system 140, in conjunction with the resource processing device 120, the VR composite credential authentication device 160 and/or other systems that are configured to initiate one or more steps of the process flows described herein. Typically, the user may seek to enroll in VR composite authentication provided/operated/facilitated by financial institutions or other entities. In some instances, the user may have a prior relationship with the financial institution or entity. For example, the user may have one or more accounts with the financial institution, with the accounts being associated with account identifiers/account numbers, with payment vehicles, like credit cards, chip cards, and/or with conventional authentication credentials like passcodes, personal identification numbers (PINs), CVV numbers, expiration dates and the like. However, the user may seek to utilize VR composite authentication to authenticate/authorize one or more user activities associated with the user's accounts for its convenience, security, non-reproducibility, and widespread applicability, and to overcome the drawbacks of the conventional authentication credentials discussed previously. Alternatively, the user may seek to establish a new account with VR composite authentication features.

The system may then request one or more authentication credentials from the user at block 402. These authentication credentials may be conventional authentication credentials or credentials already known to the financial institution or entity that may be used to identify and authenticate the user for a first time during registration. For example, the user may register for VR composite authentication for a first time at a resource processing device 120 associated with a financial institution or another entity. In this regard, the user may authenticate himself/herself for using authentication credentials comprising inserting a debit card and providing an associated PIN for the registration process 400. As another example, in the instances of the user being associated with a digital wallet, the user may authenticate himself on a user device currently coupled to the resource processing device 120, which then transmits an authentication token to the resource processing device 120 via a wireless communication channel, the authentication token comprising the validation of the user's credentials and a user device identifier. In some embodiments, the system may request additional credentials from the user to ensure the proper authentication of the user. In this regard, the system may present out of wallet questions, may seek other information of the user to authenticate the user for registration. The user may register via the process flow 400 in-person at a financial institution/entity location, at a resource processing device 120 or remotely via a user device 104 that comprises the requisite capabilities. In this regard, the system may authenticate the user for registration based at least on the successful validation of the one or more authentication credentials received from the user, as indicated by block 404. In this regard, this system may identify, authenticate and/or authorize the user based on validating the received authentication credentials at 402, in light of previously stored authentication details of the user. In some instances, the system may determine that the user is authenticated for registration based on determining that the user device being employed by the user for registration is a known, previously authenticated/authorized device. Alternatively, the system may request authentication credentials in response to determining that the user device being employed by the user for registration is an unknown, new device. As such the system may determine a security parameter associated with the device.

Next, the system may determine one or more user/electronic activities associated with the user, as illustrated by block 406. In this regard, the system may determine one or more previous electronic/user activities of the user that required authentication and may also identify or anticipate one or more future activities of the user. In some embodiments, the system may receive one or more electronic/user activities from the user. Determining one or more electronic/user activities may further comprise determining a required authentication level associated with each of the one or more electronic activities. For example, the user activities such as opening a smart door of the user's home, starting the user's vehicle, financial transactions that involve withdrawal or outgoing transfers, purchases above a predetermined purchase limit at a resource terminal 120b, may require a first high level of authentication. User activities such as financial transfers between user's accounts, viewing account information on an ATM or a resource processing device 120, printing pre-purchased tickets at a ticket vending machine, purchases below another predetermined purchase limit, may be determined to require a second moderate level of authentication lower than the first level of authentication. Other user activities, such as turning lighting devices on and off remotely, viewing information at an information kiosk and the like may be determined to require a third lower level of authentication. Therefore, the one or more user activities may be categorized based on an authentication continuum. Although three descending levels of authentication are described here, first, second, and third, more or fewer levels may be determined. For example, a topmost level of authentication higher than the first level of authentication may be determined to be required for user activities such as changes to the authentication information of the user, modification of account preferences and the like.

Next, the system may receive a user activity input associated with selection of the first electronic activity of the one or more electronic activities, as indicated by block 408. The user may select at least one user activity of the one or more determined user activities for VR composite authentication. The user may select the at least one user activity one after another in a sequence or may choose the activities all at once.

The system may then determine at least one VR composite credential type associated with the required authentication level of the selected first electronic activity and display the credential type to the user, as indicated by block 410. Determining the at least one VR composite credential type may comprise determining one or more VR composite credential types and/or one or more types of credential parameters that may singularly or in combination achieve the required authentication level for the activity. In some embodiments, the VR composite credential type may refer to unique VR composite credentials of the user that are typically not easily reproducible. In selecting a particular VR composite credential type, the following parameters may be considered, performance, prevention of circumvention and/or spoofing, robustness, size of equipment needed and identity misappropriation deterrence. Selection of the particular VR composite credential type may also be based on user requirements, authentication level required for anticipated user activities, sensor and device availability, computational time and reliability, cost, sensor size and power consumption, and the like. In some embodiments, the credential type may comprise a gesture type, a movement type, a combination type (e.g., involving a combination of spatial position-movement credentials, and biometric credentials and/or symbol parameters), a predetermined number of credentials required, and/or the like.

Upon determining the credential type that would meet the required level of authentication, the system may then request the user to provide at least one VR composite credential that matches the credential type that would meet the required level of authentication. For example, for a electronic activity involving depositing an amount into a user account, the system may determine that a gesture type of VR composite credential would meet the required authentication level. As another example, for a withdrawal type electronic activity, the system may determine that a combination type of VR composite credentials is required to meet the authentication level, with the combination including a gesture and a symbol/movement trace.

Subsequently, the system may receive/capture at least one first VR composite credential from the user for use as a credential for authenticating the user for the first electronic activity, as indicated by block 412. For example, for an electronic activity involving depositing an amount into a user account, user may provide a gesture type of VR composite credential that would meet the required authentication level, such as a closed fist gesture illustrated by FIG. 3F. As another example, for a withdrawal type electronic activity, the user may provide that a combination type of VR composite credentials that meet the authentication level, with the VR composite credential including a gesture illustrated by FIG. 3E in combination with moving the gesture to trace an oval shape in the VR space. The features and steps involved in capturing the VR composite credentials from the user will be described in detail with respect to FIG. 5.

Next, as indicated by block 414, the system may determine whether the at least one first VR composite credential associated with the selected first electronic activity matches the at least the required authentication level for the first electronic activity. In the instances where the received VR composite credential does not match the required authentication level for the first electronic activity, the system may determine that additional VR composite credentials and/or credential parameters may be required in conjunction with the first VR composite credentials provided by the user at block 412. Consequently, the system may transmit control instructions to a display device proximate the user, causing the display device to present a message requesting the user to provide additional VR composite credentials and/or credential parameters. The system may also display one or more options associated with the credential parameters. For example, the user may be informed that the including a turning motion or repositioned the user's hand to another position, in addition to the gesture provided by the user (at block 412) would meet the authentication level requirements. In this instance, based on the directions displayed by the system, the user may begin providing the gesture in combination with a turning motion.

In some embodiments, the system may enable the user to associate categories of electronic/user activities and/or electronic activity types with particular VR composite credentials for ease of remembrance of the user. This feature will be illustrated with an example of a financial user activity, although it is understood that this and all other features described herein may find applicability on both financial and non-financial user activities. For example, the user may be associated with multiple accounts and may be able to perform multiple user activities associated with the accounts. The system may enable the user to register a first financial credential comprising a peace symbol gesture with the user's fingers of the left hand for a first financial account or payment instrument like a credit card. The system may further enable the user to register a second financial credential comprising raising the users right had above the user's left hand while the left hand traces a "2" symbol path in the VR space. Therefore for a user activity comprising a purchase the user may provide the combination of credentials/parameters associated with the account the user wishes to debit. Here, the system may initiate processing of the purchase and authorize the purchase with the second account automatically based on determining that the user has provided the credentials associated with the left hand and the right hand, as described above. Therefore, the user is not required to carry multiple cards or mobile phones, or any other devices associated with the accounts, and spend time finding a choosing the right card, swiping the card, providing a PIN etc.

In some embodiments, the system may enable the user to associate/register one or more VR composite credentials and/or credential parameters associated with categories of user activities. Continuing with the previous example, the system may enable the user to register a first credential parameter comprising swiveling the user's right hand with a particular speed for viewing account information. The system may also enable the user to register a second credential parameter comprising orienting the one or more of the user's left hand in a predetermined fashion and swiping at least one phalange/finger in a predetermined direction, with a second user activity of making a cash withdrawal. Therefore, one credential parameter associated with a particular activity may be applicable across multiple accounts associated with that activity.

In some embodiments, the system may enable the user to register misappropriation VR composite credentials. In the event that the user may be compelled into performing a user activity by an unauthorized individual, the user may provide the misappropriation VR composite credentials instead of the usual VR composite credentials for the activity. On recognizing the misappropriation VR composite credentials, the system may automatically initiate presentation of a mock interface with mockup financial information of the user, while automatically locking the accounts associated with the user, until the correct credentials are provided.

Therefore, this infinite customizability of VR composite authentication of the present invention enables the user to choose the VR composite credentials that are most comfortable to the user and that are most like to be recalled by the user. In some instances, tactile gestures of the VR composite credentials may be easily recalled by the user in comparison with long alphanumeric strings. Furthermore, in addition to being extremely convenient for the user, and the present invention also prevents misappropriation since unauthorized individuals are exceedingly unlikely to obtain the VR composite credentials of the various phalanges/hands/body parts of the user and also determine the credential parameters, much less determine the specific combinations of credentials and categories of credentials for particular user activities.

In some embodiments, the system may request the user to provide the VR composite credential for registration multiple times so that minor variations in credential parameters thereof due to inherent variability of user actions/positioning can be captured by the system. Here, the system may request the user to present the at least one first VR composite credential for a predetermined additional number of times. The system may capture the at least one first VR composite credential from the user sequentially, for each the predetermined additional number of times. Next, the system may determine one or more median credential parameters associated with the captured at least one first VR composite credential for each the predetermined additional number of times, and subsequently determine a credential parameter range for each of the one or more median credential parameters based on the one or more median credential parameters associated each the predetermined additional number of times. The credential parameter range encapsulates the minor variations in the parameters due to inherent variability of user actions/positioning.

At block 416, in response to determining that the at least one first VR composite credential associated with the selected first electronic activity matches the at least the required authentication level for the first electronic activity, the system may construct the first VR authentication linked pair associated with the at least one first VR composite credential. Here, the first VR authentication linked pair comprises an coded activity word component associated with the first electronic activity and the first coded word set associated with the at least one first VR composite credential. For example, the first VR authentication linked pair may comprise (i) an coded activity word component comprising "deposit" and (ii) a first coded word set associated with the at least one first VR composite credential comprising "right hand", "peace gesture", and "circular motion".

Here, the system may then perform pre-processing of the captured one or more VR composite credentials. In this regard, the system may remove background noise, normalize the image, and perform other image processing steps. Typically, pre-processing may involve transforming the optical images, capacitive images and/or ultrasonic images to a uniform format. Next, the system may extract one or more features of the one or more VR composite credentials. In this regard, the system may determine the necessary features of the credentials that are required to authenticate the user and discard the rest of the image. Subsequently, the system may generate a VR composite credential template associated with the one or more VR composite credentials. In this regard, the system may create a vector of numbers to create a template. Typically, the template is a synthesis of the relevant characteristics extracted from the VR composite credentials. Elements of the VR composite credentials that are not required for identification/authentication of the user are discarded in the template to reduce the memory requirements and to protect the identity of the user. Typically, the template is an uniform electronic template comprising the relevant features of the VR composite credentials and/or the credential parameters that are required for VR composite authentication.

Next the system may store the VR composite credential template in the VR composite credential authentication database 108. In this regard, the system may encrypt/encode the VR composite credential templates prior to storing the templates in the database, such that the templates may only be accessed, retrieved or modified using s specific decoding key stored in a secure memory location of a system. In some embodiments, the system may generate separate templates for the VR composite credentials and the credential parameters. In this instance, the system may store the templates associated with the VR composite credentials and the credential parameters, in separate memory locations, databases and associate them using pointers and the like.

The credentials received by the system at block 412 during the process flow 400, may be stored in the VR composite credential authentication database 108 to be used as references, for future authentication of user activities, as indicated by block 418. Specifically, the system may store the constructed first VR authentication linked pair in the VR credential database. In the embodiments where the user provides the credentials multiple times to ensure that inherent variations are captures, the system may store the credential parameter range for each of the one or more median credential parameters in the VR credential database linked to the first VR authentication linked pair.

Figure 5:
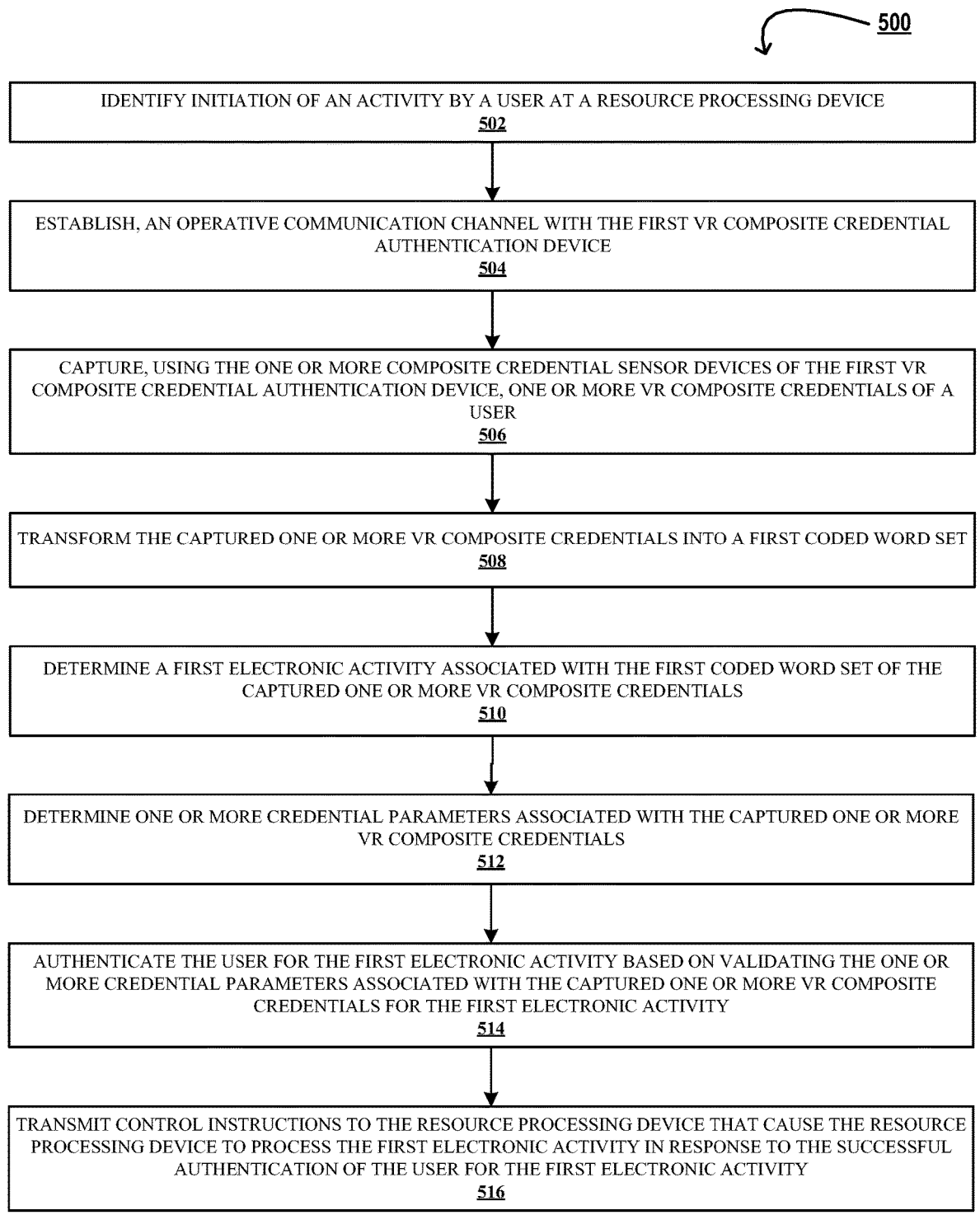
FIG. 5 illustrates a block diagram depicting a high level process flow 500 for construction and detection of spatial movements in a virtual reality (VR) space for performance of electronic activities, in accordance with an embodiment of the invention.

FIG. 5 illustrates a block diagram depicting a high level process flow 500 for construction and detection of spatial movements in a virtual reality (VR) space for performance of electronic activities, in accordance with an embodiment of the invention. In some embodiments, the "system" or the "authentication system" as used henceforth, may refer to the processing system 140, such that the processing system 140 may perform some of all the steps of process flow 500 herein. In other embodiments, the "system" may refer to the processing system 140, in conjunction with the resource processing device 120, the VR composite credential authentication device 160 and/or other systems that are configured to initiate one or more steps of the process flows described herein. Initially, at block 502, the system may identify initiation of an activity by a user at a resource processing device. Here, the system may receive an indication that the user seeks to perform an electronic activity at a resource processing device 120. In this regard, receiving the indication may comprise determining that the user is approaching or within a predetermined distance of the resource processing device 120, receiving the indication from a third party system, and/or receiving the indication from the user. In some embodiments, receiving the indication may comprise determining that the user is located within capture region 330 (e.g., as described with respect to FIGS. 3B and 3C previously).

Next at block 504, the system may establish, an operative communication channel with the first VR composite credential authentication device 160. As discussed previously, the first VR composite credential authentication device 160 is associated with the one or more composite credential sensor devices. Here, in some embodiments, the system may first identify a plurality of VR composite credential authentication devices 160 associated with the resource processing device. Next, the system may determine that the first VR composite credential authentication device 160 (and/or its sensors) is compatible for capturing the one or more VR composite credentials from the user at the first time based on (i) a position of the user, (ii) a credential type associated with the one or more VR composite credentials. For instance, the system may activate the sensors that are located closest to the user. Accordingly, the system may activate the first VR composite credential authentication device 160 of the plurality of VR composite credential authentication devices 160 in response to determining that the first VR composite credential authentication device 160 is compatible for capturing the one or more VR composite credentials from the user at the first time. Here, the system may deactivate a second VR composite credential authentication device 160 of the plurality of VR composite credential authentication devices 160 in response to determining that the second VR composite credential authentication device 160 is not compatible for capturing the one or more VR composite credentials from the user at the first time.

In some embodiments, the system may detect a malfunction associated with a first authentication method associated with the resource processing device (e.g., a card-based authentication). In response to detecting the malfunction, the system may activate the one or more composite credential sensor devices of the first VR composite credential authentication device 160 to commence a VR composite credential authentication. In some embodiments, the system may determine that the user is unable to perform conventional authentication, and trigger VR authentication in response.

Next, the system may capture one or more VR composite credentials of the user using the one or more composite credential sensor devices of the first VR composite credential authentication device 160, as indicated by block 506. The capturing of the one or more VR composite credentials may be substantially similar to that described with respect to FIGS. 2-3F. Additionally, the credential parameters may also be sensed/identified using the VR composite credential sensors like radio frequency, thermal, pressure, piezoresistive/piezoelectric, microelectromechanical sensors, and the like. As discussed previously, capturing the one or more VR composite credentials may comprise generating images of the associated phalanges/fingers/body parts. These images may be optical images, capacitive images and/or ultrasonic images. In some embodiments, capturing the one or more VR composite credentials may comprise removing artifacts from the sensor, to enhance the input. In this regard, the system may transmit control signals to the VR composite credential sensor devices, via the VR composite credential authentication device 160. As discussed previously, in some embodiments, the one or more VR composite credentials are associated with phalanges of the user. Here, the one or more credential parameters associated with the one or more one or more VR composite credentials comprise hand position of one or more hands of the user, finger position of one or more fingers of the user, hand movement of one or more hands of the user and/or finger movement of one or more fingers of the user.

The system may then analyze the received one or more VR composite credentials. In this regard, the system may first identify the user. In this regard, the system may extract the first VR composite credential and compare it with reference templates retrieved from the VR composite credential authentication database 108. Comparing the first VR composite credential with reference templates in the VR composite credential authentication database 108 may comprise estimating the distance between them using an authentication algorithm (e.g. Hamming distance), to determine the best match. Subsequently, the system may establish the identity of the user. In this regard, the identification of the user may comprise positive recognition of the user. Furthermore, the system may determine user information based on the identification of the user.

In some embodiments, for capturing the one or more VR composite credentials of the user, the system may first detect, using the one or more VR spatial sensor devices, one or more first mechanical degree of freedom coordinate parameters of the user in a predetermined capture region proximate the one or more VR spatial sensor devices, as described previously with respect to FIGS. 3A-3F. The system may then analyze the detected first mechanical degree of freedom coordinate parameters to determine that the detected first mechanical degree of freedom coordinate parameters are associated with at least one credential parameter range associated with the user stored at the VR credential database (e.g., velocity in a particular range, positional parameters in a particular range, etc.). Moreover, the system may determine one or more spatial position-movement credentials of the user based on the detected one or more first mechanical degree of freedom coordinate parameters. For instance, the system may determine that the captured credentials trace a path in a "V" shape with a right hand that begins at position A (X1, Y1, Z1) and ends at A' (X1', Y1', Z1'), with the right hand having a closed fist gesture. As such the one or more VR composite credentials of the user comprise the one or more spatial position-movement credentials. Here, the system may also detect, using the one or more VR spatial sensor devices, one or more second mechanical degree of freedom coordinate parameters of the user in the predetermined capture region proximate the one or more VR spatial sensor devices. For example, the system may detect parameters associated with the user's feet. However, in this instance, the system may discard the one or more second mechanical degree of freedom coordinate parameters in response to determining that the detected first mechanical degree of freedom coordinate parameters are not associated with at least one credential parameter range associated with the user stored at the VR credential database.

As discussed previously, the VR composite credentials of the user may comprise a combination of (i) one or more spatial position-movement credentials and (ii) one or more biometric credentials of the user. Here, for capturing the one or more VR composite credentials of the user, the system may detect a first VR composite credential comprising one or more spatial position-movement credentials of the user. Next, the system may detect, using the one or more biometric sensor devices, a second VR composite credential comprising one or more biometric credentials of the user. As discussed previously, the biometric credentials may comprise (i) a facial image credential, (ii) a user voice credential, (iii) a user verbal phrase credential, and/or the like. As such, the one or more VR composite credentials may comprise (i) the one or more spatial position-movement credentials of the user and (ii) the biometric credentials of the user.

Next, at block 508, the system may transform the captured one or more VR composite credentials into a first coded word set. First, the system may then perform pre-processing of the captured one or more VR composite credentials. In this regard, the system may remove background noise, normalize the image, and perform other image processing steps. Typically, pre-processing may involve transforming the optical images, capacitive images and/or ultrasonic images to a uniform format. Next, the system may extract one or more features of the one or more VR composite credentials. In this regard, the system may determine the necessary features of the credentials that are required to authenticate the user and discard the rest of the image. As such the system may extract the one or more credential parameters of the captured one or more VR composite credentials. The system may then convert the parameters to words (e.g., "left hand", "wave gesture", etc.). The system may parse a plurality of coded work sets associated with the user from the VR credential database associated with the user. Next, the system may identify the first coded word set of the plurality of coded work sets that matches the one or more credential parameters.

In some embodiments, the system may generate a VR composite credential template associated with the one or more VR composite credentials. In this regard, the system may create a vector of numbers to create a template. Typically, the template is a synthesis of the relevant characteristics extracted from the VR composite credentials and generate the first coded word set describing/identifying the characteristics. Elements of the VR composite credentials that are not required for identification/authentication of the user are discarded in the template to reduce the memory requirements and to protect the identity of the user. Typically, the template is an uniform electronic template comprising the relevant features of the VR composite credentials and/or the credential parameters that are required for VR composite authentication. The system may store the VR composite credential templates in temporary memory locations and compare them with extracted registered templates from the VR composite credential authentication database 108. The system may discard the templates after validation of the credentials. The system may Next, at block 510, the system may determine a first electronic activity associated with the first coded word set of the captured one or more VR composite credentials. Here the system may first parse the VR composite credential authentication database 108 and identify a first VR authentication linked pair associated with the first coded word set stored in the VR credential database. The system may then determine the first electronic activity based on the first VR authentication linked pair. For example, the system may analyze the gesture to determine the coded word set of "right hand", "peace gesture", and "circular motion". The system may determine this matches a stored first VR authentication linked pair comprising (i) an coded activity word component comprising "deposit" and (ii) a first coded word set associated with the at least one first VR composite credential comprising "right hand", "peace gesture", and "circular motion". Accordingly, the system may determine the first electronic activity to be a deposit.

Next, the system may determine one or more credential parameters associated with the captured one or more VR composite credentials, as indicated by block 512. Here, the system may identify and analyze the credential parameters (e.g., degree of freedom parameters, position parameters/ coordinates, etc.) associated with the VR composite credentials. The system may compare the credential parameters extracted from the template with credential parameters retrieved from the VR composite credential authentication database 108 to determine if the type and combination of credential parameters are associated with the identified user. In this way the system may validate the one or more VR composite credentials and the one or more credential parameters associated with the user.

In the instances where the one or more VR composite credentials comprise one or more spatial position-movement credentials of the user, determining the one or more credential parameters associated with the captured one or more VR composite credentials further comprises determining a first gesture associated with the one or more spatial position-movement credentials. Here, in some embodiments, determining one or more credential parameters involves determining one or more dimensional parameters associated with the one or more spatial position-movement credentials. The one or more dimensional parameters may comprise a size parameter and/or a distance parameter, as described previously with respect to FIGS. 3A-3F. In this regard, validating the one or more credential parameters for the first electronic activity may comprise determining that (i) the first gesture and (ii) the one or more dimensional parameters associated with the one or more spatial position-movement credentials match the first electronic activity.

Here, in some embodiments, determining one or more credential parameters involves determining a symbol parameter associated with the one or more spatial position-movement credentials, as described previously with respect to FIGS. 3A-3F. The symbol parameter comprises a symbol traced by the one or more spatial position-movement credentials. In this regard, validating the one or more credential parameters for the first electronic activity further comprises determining that (i) the first gesture and (ii) the symbol parameter associated with the one or more spatial position-movement credentials match the first electronic activity.

As indicated by block 514, the system may authenticate the user for the first electronic activity based on validating the one or more credential parameters associated with the captured one or more VR composite credentials for the first electronic activity. If the credential parameters are determined to not be associated with the user/the user's first VR composite credentials, the system may request the user to provide the VR composite credentials again.

In the instances where the VR composite credentials comprise (i) the one or more spatial position-movement credentials of the user and (ii) the biometric credentials of the user, validating the one or more credential parameters associated with the captured one or more VR composite credentials may comprise validating the one or more credential parameters associated with (i) the one or more spatial position-movement credentials of the user and (ii) the biometric credentials of the user.

In some embodiments, validating the one or more credential parameters associated with the captured one or more VR composite credentials for the first electronic activity at the first time involves determining that each of the one or more credential parameters match the associated credential parameter range.

As indicated by block 516, the system may transmit control instructions to the resource processing device that cause the resource processing device to process the first electronic activity in response to the successful authentication of the user for the first electronic activity. Here, processing or initiating the user activity may comprise transmitting control instructions to the resource processing device 120 that are configured to cause the resource processing device 120 to execute, initiate, process and/or complete the user activity. For example, the system may transmit control signals to a resource processing device 120 to cause the resource processing device 120 authorize a transaction/user activity, to present notifications, to dispense one or more physical objects or receipts. In some embodiments, the system may initiate the transaction, such as a deposit transaction, a monetary transfer between accounts and the like and the like and cause the resource processing device 120 to preset confirmation and/or status of the user activity. As another example, the system may transmit control signals to a processing device (resource processing device 120) of a smart door, which cause an actuator of the smart door to lock or unlock the smart door, depending on the received credentials. As yet another example, the system may transmit control instructions to a ignition device of a smart vehicle to cause the vehicle to start.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for construction and detection of spatial movements in a virtual reality (VR) space for performance of electronic activities, wherein the system, via a VR composite credential authentication device, is structured for capturing, customizing and transforming one or more VR composite credentials of a user and authenticating electronic activities based on at least the VR composite credentials, comprising:

a first VR composite credential authentication device comprising one or more composite credential sensor devices, comprising:
   one or more VR spatial sensor devices configured for capture and imaging of VR spatial movement and position credentials; and
   one or more biometric sensor devices;
at least one memory device with computer-readable program code stored thereon;
at least one communication device;
at least one processing device operatively coupled to the first VR composite credential authentication device, the at least one memory device and the at least one communication device, wherein executing the computer-readable code is configured to cause the at least one processing device to:
   identify initiation of an activity by a user at a resource processing device;
   establish, an operative communication channel with the first VR composite credential authentication device, the first VR composite credential authentication device being associated with the one or more composite credential sensor devices;
   capture, using the one or more composite credential sensor devices of the first VR composite credential authentication device, one or more VR composite credentials of a user at a first time, wherein capturing the one or more VR composite credentials of the user further comprises identifying the user based on the captured one or more VR composite credentials;
   transform the captured one or more VR composite credentials into a first coded word set;
   determine a first electronic activity associated with the first coded word set of the captured one or more VR composite credentials, wherein determining the first electronic activity further comprises:
      parsing a VR credential database associated with the user;
      identifying a first VR authentication linked pair associated with the first coded word set stored in the VR credential database; and
      determining the first electronic activity based on the first VR authentication linked pair;
   determine one or more credential parameters associated with the captured one or more VR composite credentials;
   authenticate the user for the first electronic activity based on validating the one or more credential parameters associated with the captured one or more VR composite credentials for the first electronic activity;
   transmit control instructions to the resource processing device that cause the resource processing device to process the first electronic activity in response to successful authentication of the user for the first electronic activity; and
   customizably register the user for VR composite credential authentication at a second time preceding the first time, wherein registering further comprises:
      requesting one or more authentication credentials from the user;
      authenticating the user for registration based at least on successful validation of the one or more authentication credentials received from the user;
      determining one or more electronic activities associated with the user, wherein determining the one or more electronic activities comprises determining a required authentication level associated with each of the one or more electronic activities;

receiving a user activity input associated with selection of the first electronic activity of the one or more electronic activities;

determining at least one credential type associated with the required authentication level of the selected first electronic activity and display the credential type to the user;

receiving at least one first VR composite credential from the user, wherein the first VR composite credential is configured for authenticating the user for the first electronic activity;

determining whether the at least one first VR composite credential associated with the selected first electronic activity matches the at least the required authentication level for the first electronic activity;

in response to determining that the at least one first VR composite credential associated with the selected first electronic activity matches the at least the required authentication level for the first electronic activity, constructing the first VR authentication linked pair associated with the at least one first VR composite credential, wherein the first VR authentication linked pair comprises an coded activity word component associated with the first electronic activity and the first coded word set associated with the at least one first VR composite credential; and storing the constructed first VR authentication linked pair in the VR credential database.

2. The system of claim 1, wherein the one or more VR composite credentials are associated with phalanges of the user, wherein the one or more credential parameters associated with the one or more one or more VR composite credentials comprise hand position of one or more hands of the user, finger position of one or more fingers of the user, hand movement of one or more hands of the user and/or finger movement of one or more fingers of the user.

3. The system of claim 1, wherein capturing the one or more VR composite credentials of the user further comprises:

detecting, using the one or more VR spatial sensor devices, one or more first mechanical degree of freedom coordinate parameters of the user in a predetermined capture region proximate the one or more VR spatial sensor devices;

analyzing the detected one or more first mechanical degree of freedom coordinate parameters to determine that the detected one or more first mechanical degree of freedom coordinate parameters are associated with at least one credential parameter range associated with the user stored at the VR credential database; and determining one or more spatial position-movement credentials of the user based on the detected one or more first mechanical degree of freedom coordinate parameters, wherein the one or more VR composite credentials of the user comprise the one or more spatial position-movement credentials.

4. The system of claim 3, wherein executing the computer-readable code is configured to further cause the at least one processing device to:

detect, using the one or more VR spatial sensor devices, one or more second mechanical degree of freedom coordinate parameters of the user in the predetermined capture region proximate the one or more VR spatial sensor devices;

discard the one or more second mechanical degree of freedom coordinate parameters in response to determining that the detected one or more first mechanical degree of freedom coordinate parameters are not associated with at least one credential parameter range associated with the user stored at the VR credential database.

5. The system of claim 1, wherein capturing the one or more VR composite credentials of the user further comprises:

detecting, using the one or more VR spatial sensor devices, a first VR composite credential of the one or more VR composite credentials, wherein the first VR composite credential comprises one or more spatial position-movement credentials of the user; and detecting, using the one or more biometric sensor devices, a second VR composite credential of the one or more VR composite credentials, wherein the second VR composite credential comprises one or more biometric credentials of the user, wherein the one or more biometric credentials comprise (i) a facial image credential, (ii) a user voice credential, and/or (iii) a user verbal phrase credential; and wherein the one or more VR composite credentials comprise (i) the one or more spatial position-movement credentials of the user and (ii) the biometric credentials of the user; and wherein validating the one or more credential parameters associated with the captured one or more VR composite credentials for the first electronic activity comprises validating the one or more credential parameters associated with (i) the one or more spatial position-movement credentials of the user and (ii) the biometric credentials of the user.

6. The system of claim 1, wherein establishing the operative communication channel with the first VR composite credential authentication device further comprises:

identifying a plurality of VR composite credential authentication devices associated with the resource processing device;

determining that the first VR composite credential authentication device is compatible for capturing the one or more VR composite credentials from the user at the first time based on (i) a position of the user, (ii) a credential type associated with the one or more VR composite credentials; and activating the first VR composite credential authentication device of the plurality of VR composite credential authentication devices in response to determining that the first VR composite credential authentication device is compatible for capturing the one or more VR composite credentials from the user at the first time.

7. The system of claim 6, wherein executing the computer-readable code is configured to further cause the at least one processing device to:

deactivate a second VR composite credential authentication device of the plurality of VR composite credential authentication devices in response to determining that the second VR composite credential authentication device is not compatible for capturing the one or more VR composite credentials from the user at the first time.

8. The system of claim 1, wherein establishing the operative communication channel with the first VR composite credential authentication device further comprises:

detecting a malfunction associated with a first authentication method associated with the resource processing device; and in response to detecting the malfunction, activating the one or more composite credential sensor devices of the first VR composite credential authentication device.

9. The system of claim 1, wherein executing the computer-readable code is configured to further cause the at least one processing device to, in response to determining that the at least one first VR composite credential associated with the selected first electronic activity matches the at least the required authentication level for the first electronic activity:
request the user to present the at least one first VR composite credential for a predetermined additional number of times;
capturing the at least one first VR composite credential from the user sequentially, for each the predetermined additional number of times;
determining one or more median credential parameters associated with the captured at least one first VR composite credential for each the predetermined additional number of times;
determining a credential parameter range for each of the one or more median credential parameters based on the one or more median credential parameters associated each the predetermined additional number of times; and
storing the storing the credential parameter range for each of the one or more median credential parameters in the VR credential database linked to the first VR authentication linked pair; and
wherein validating the one or more credential parameters associated with the captured one or more VR composite credentials for the first electronic activity at the first time comprises determining that each of the one or more credential parameters match the associated credential parameter range.

10. The system of claim 1, wherein transforming the captured one or more VR composite credentials into the first coded word set further comprises:
performing pre-processing of the captured one or more VR composite credentials;
extracting the one or more credential parameters of the captured one or more VR composite credentials;
parsing a plurality of coded work sets associated with the user from the VR credential database associated with the user; and
identifying the first coded word set of the plurality of coded work sets that matches the one or more credential parameters.

11. The system of claim 1, wherein the one or more VR composite credentials comprise one or more spatial position-movement credentials of the user, wherein determining one or more credential parameters associated with the captured one or more VR composite credentials further comprises determining a first gesture associated with the one or more spatial position-movement credentials.

12. The system of claim 11, wherein determining one or more credential parameters associated with the captured one or more VR composite credentials further comprises:
determining one or more dimensional parameters associated with the one or more spatial position-movement credentials, wherein the one or more dimensional parameters comprise a size parameter and/or a distance parameter; and
wherein validating the one or more credential parameters for the first electronic activity further comprises determining that (i) the first gesture and (ii) the one or more dimensional parameters associated with the one or more spatial position-movement credentials match the first electronic activity.

13. The system of claim 11, wherein determining one or more credential parameters associated with the captured one or more VR composite credentials further comprises:
determining a symbol parameter associated with the one or more spatial position-movement credentials, wherein the symbol parameter comprises a symbol traced by the one or more spatial position-movement credentials; and
wherein validating the one or more credential parameters for the first electronic activity further comprises determining that (i) the first gesture and (ii) the symbol parameter associated with the one or more spatial position-movement credentials match the first electronic activity.

14. A computer program product construction and detection of spatial movements in a virtual reality (VR) space for performance of electronic activities, wherein the computer program product, via a first VR composite credential authentication device, is structured for capturing, customizing and transforming one or more VR composite credentials of a user and authenticating electronic activities based on at least the VR composite credentials, the computer program product comprising a non-transitory computer-readable storage medium having computer-executable instructions to:
identify initiation of an activity by a user at a resource processing device;
establish, an operative communication channel with the first VR composite credential authentication device, the first VR composite credential authentication device being associated with one or more composite credential sensor devices;
capture, using the one or more composite credential sensor devices of the first VR composite credential authentication device, one or more VR composite credentials of a user at a first time, wherein capturing the one or more VR composite credentials of the user further comprises identifying the user based on the captured one or more VR composite credentials;
transform the captured one or more VR composite credentials into a first coded word set;
determine a first electronic activity associated with the first coded word set of the captured one or more VR composite credentials, wherein determining the first electronic activity further comprises:
parsing a VR credential database associated with the user;
identifying a first VR authentication linked pair associated with the first coded word set stored in the VR credential database; and
determining the first electronic activity based on the first VR authentication linked pair;
determine one or more credential parameters associated with the captured one or more VR composite credentials;
authenticate the user for the first electronic activity based on validating the one or more credential parameters associated with the captured one or more VR composite credentials for the first electronic activity;
transmit control instructions to the resource processing device that cause the resource processing device to process the first electronic activity in response to successful authentication of the user for the first electronic activity; and
customizably register the user for VR composite credential authentication at a second time preceding the first time, wherein registering further comprises:

requesting one or more authentication credentials from the user;

authenticating the user for registration based at least on successful validation of the one or more authentication credentials received from the user;

determining one or more electronic activities associated with the user, wherein determining the one or more electronic activities comprises determining a required authentication level associated with each of the one or more electronic activities;

receiving a user activity input associated with selection of the first electronic activity of the one or more electronic activities;

determining at least one credential type associated with the required authentication level of the selected first electronic activity and display the credential type to the user;

receiving at least one first VR composite credential from the user, wherein the first VR composite credential is configured for authenticating the user for the first electronic activity;

determining whether the at least one first VR composite credential associated with the selected first electronic activity matches the at least the required authentication level for the first electronic activity;

in response to determining that the at least one first VR composite credential associated with the selected first electronic activity matches the at least the required authentication level for the first electronic activity, constructing the first VR authentication linked pair associated with the at least one first VR composite credential, wherein the first VR authentication linked pair comprises an coded activity word component associated with the first electronic activity and the first coded word set associated with the at least one first VR composite credential; and storing the constructed first VR authentication linked pair in the VR credential database.

15. The computer program product of claim 14, wherein the one or more VR composite credentials are associated with phalanges of the user, wherein the one or more credential parameters associated with the one or more one or more VR composite credentials comprise hand position of one or more hands of the user, finger position of one or more fingers of the user, hand movement of one or more hands of the user and/or finger movement of one or more fingers of the user.

16. The computer program product of claim 14, wherein the one or more VR composite credentials comprise one or more spatial position-movement credentials of the user, wherein determining one or more credential parameters associated with the captured one or more VR composite credentials further comprises determining a first gesture associated with the one or more spatial position-movement credentials.

17. A computerized method for construction and detection of spatial movements in a virtual reality (VR) space for performance of electronic activities, wherein the computerized method, via a first VR composite credential authentication device, is structured for capturing, customizing and transforming one or more VR composite credentials of a user and authenticating electronic activities based on at least the VR composite credentials, the computerized method comprising:

identifying initiation of an activity by a user at a resource processing device;

establishing, an operative communication channel with the first VR composite credential authentication device, the first VR composite credential authentication device being associated with one or more composite credential sensor devices;

capturing, using the one or more composite credential sensor devices of the first VR composite credential authentication device, one or more VR composite credentials of a user at a first time, wherein capturing the one or more VR composite credentials of the user further comprises identifying the user based on the captured one or more VR composite credentials;

transforming the captured one or more VR composite credentials into a first coded word set;

determining a first electronic activity associated with the first coded word set of the captured one or more VR composite credentials, wherein determining the first electronic activity further comprises:

parsing a VR credential database associated with the user;

identifying a first VR authentication linked pair associated with the first coded word set stored in the VR credential database; and determining the first electronic activity based on the first VR authentication linked pair;

determining one or more credential parameters associated with the captured one or more VR composite credentials;

authenticating the user for the first electronic activity based on validating the one or more credential parameters associated with the captured one or more VR composite credentials for the first electronic activity;

transmitting control instructions to the resource processing device that cause the resource processing device to process the first electronic activity in response to successful authentication of the user for the first electronic activity; and customizably registering the user for VR composite credential authentication at a second time preceding the first time, wherein registering further comprises:

requesting one or more authentication credentials from the user;

authenticating the user for registration based at least on successful validation of the one or more authentication credentials received from the user;

determining one or more electronic activities associated with the user, wherein determining the one or more electronic activities comprises determining a required authentication level associated with each of the one or more electronic activities;

receiving a user activity input associated with selection of the first electronic activity of the one or more electronic activities;

determining at least one credential type associated with the required authentication level of the selected first electronic activity and display the credential type to the user;

receiving at least one first VR composite credential from the user, wherein the first VR composite credential is configured for authenticating the user for the first electronic activity;

determining whether the at least one first VR composite credential associated with the selected first electronic activity matches the at least the required authentication level for the first electronic activity;

in response to determining that the at least one first VR composite credential associated with the selected first electronic activity matches the at least the required authentication level for the first electronic activity, constructing the first VR authentication linked pair associated with the at least one first VR composite credential, wherein the first VR authentication linked pair comprises an coded activity word component associated with the first electronic activity and the first coded word set associated with the at least one first VR composite credential; and storing the constructed first VR authentication linked pair in the VR credential database.

18. The computerized method of claim 17, wherein the one or more VR composite credentials are associated with phalanges of the user, wherein the one or more credential parameters associated with the one or more one or more VR composite credentials comprise hand position of one or more hands of the user, finger position of one or more fingers of the user, hand movement of one or more hands of the user and/or finger movement of one or more fingers of the user.

19. The computerized method of claim 17, wherein the one or more VR composite credentials comprise one or more spatial position-movement credentials of the user, wherein determining one or more credential parameters associated with the captured one or more VR composite credentials further comprises determining a first gesture associated with the one or more spatial position-movement credentials.

* * * * *